(12) United States Patent
Altberg et al.

(10) Patent No.: US 8,843,107 B2
(45) Date of Patent: Sep. 23, 2014

(54) METHODS AND APPARATUSES TO CONNECT USERS OF MOBILE DEVICES TO ADVERTISERS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US)

(73) Assignee: YP Interactive LLC, Wilmington, DE (US)

( * ) Notice: Subject to any disclaimer, the term of this patent is extended or adjusted under 35 U.S.C. 154(b) by 684 days.

(21) Appl. No.: 12/027,208

(22) Filed: Feb. 6, 2008

(65) Prior Publication Data

US 2008/0194260 A1 Aug. 14, 2008

Related U.S. Application Data

(60) Provisional application No. 60/888,935, filed on Feb. 8, 2007.

(51) Int. Cl.
*H04M 11/00* (2006.01)
*H04M 3/493* (2006.01)
*H04W 24/00* (2009.01)
*G06Q 30/02* (2012.01)

(52) U.S. Cl.
CPC ...................................... *G06Q 30/02* (2013.01)
USPC ...................... 455/406; 455/414.2; 455/456.1

(58) Field of Classification Search
USPC ............. 455/406, 414.2, 414.3, 456.1, 456.2, 455/456.3, 456, 5, 456.6
See application file for complete search history.

(56) References Cited

U.S. PATENT DOCUMENTS

| 4,850,007 A | 7/1989 | Marino et al. |
| 4,963,995 A | 10/1990 | Lang |
| 5,057,932 A | 10/1991 | Lang |
| 5,164,839 A | 11/1992 | Lang |

(Continued)

FOREIGN PATENT DOCUMENTS

| KR | 20030035646 | 5/2003 |
| KR | 20050014963 | 2/2005 |

(Continued)

OTHER PUBLICATIONS

PCT Written Opinion of the International Searching Authority for PCT/US2008/053316, Jun. 26, 2008.

(Continued)

*Primary Examiner* — Michael Faragalla
*Assistant Examiner* — Scott Au
(74) *Attorney, Agent, or Firm* — Greenberg Traurig LLP

(57) ABSTRACT

Methods and apparatuses to connect a user of a telephony device to a selected one of service providers of a predefined category. One embodiment includes: providing a user interface element on a dial interface of a telephonic device to represent a communication reference associated with a pre-defined category of services; and responsive to a user selection of the user interface element, initiating a request from the telephonic device using the communication reference for a telephone connection to a service provider of the pre-defined category; where the service provider is to be selected from a plurality of service providers of the pre-defined category in response to the request and to be charged in response to a telephone lead connected to the service provider.

20 Claims, 41 Drawing Sheets

(56) References Cited

U.S. PATENT DOCUMENTS

| | | |
|---|---|---|
| 5,262,875 A | 11/1993 | Mincer et al. |
| 5,440,334 A | 8/1995 | Walters et al. |
| 5,524,146 A | 6/1996 | Morrisey et al. |
| 5,696,965 A | 12/1997 | Dedrick |
| 5,710,970 A | 1/1998 | Walters et al. |
| 5,751,956 A | 5/1998 | Kirsch |
| 5,774,534 A | 6/1998 | Mayer |
| 5,793,851 A | 8/1998 | Albertson |
| 5,850,433 A | 12/1998 | Rondeau |
| RE36,111 E | 2/1999 | Neville |
| 5,870,546 A | 2/1999 | Kirsch |
| 5,937,390 A | 8/1999 | Hyodo |
| 5,963,202 A | 10/1999 | Polish |
| 5,963,861 A | 10/1999 | Hanson |
| 5,978,567 A | 11/1999 | Rebane et al. |
| 5,995,705 A | 11/1999 | Lang |
| 5,999,965 A | 12/1999 | Kelly |
| 6,108,704 A | 8/2000 | Hutton et al. |
| 6,189,030 B1 | 2/2001 | Kirsch et al. |
| 6,208,713 B1 | 3/2001 | Rahrer et al. |
| 6,216,111 B1 | 4/2001 | Walker et al. |
| 6,243,684 B1 | 6/2001 | Stuart et al. |
| 6,269,361 B1 | 7/2001 | Davis et al. |
| 6,275,490 B1 | 8/2001 | Mattaway et al. |
| 6,327,572 B1 | 12/2001 | Morton et al. |
| 6,466,966 B1 | 10/2002 | Kirsch et al. |
| 6,470,079 B1 | 10/2002 | Benson |
| 6,470,181 B1 | 10/2002 | Maxwell |
| 6,510,417 B1 | 1/2003 | Woods et al. |
| 6,516,057 B2 | 2/2003 | Meek et al. |
| 6,529,878 B2 | 3/2003 | De Rafael et al. |
| 6,560,576 B1 | 5/2003 | Cohen et al. |
| 6,731,736 B2 | 5/2004 | Meek et al. |
| 6,760,537 B2 | 7/2004 | Mankovitz |
| 6,769,020 B2 | 7/2004 | Miyazaki et al. |
| 6,850,965 B2 | 2/2005 | Allen |
| 6,856,809 B2 | 2/2005 | Fostick |
| 6,859,833 B2 | 2/2005 | Kirsch et al. |
| 6,968,174 B1 | 11/2005 | Trandal et al. |
| 7,01,0293 B2 * | 3/2006 | Go ............................. 455/414.3 |
| 7,076,037 B1 | 7/2006 | Gonen et al. |
| 7,085,555 B2 * | 8/2006 | Zellner et al. .............. 455/414.1 |
| 7,092,901 B2 | 8/2006 | Davis et al. |
| 7,103,010 B2 | 9/2006 | Melideo |
| 7,120,235 B2 * | 10/2006 | Altberg et al. ........... 379/114.13 |
| 7,181,415 B2 | 2/2007 | Blaser et al. |
| 7,187,761 B2 | 3/2007 | Bookstaff |
| 7,200,413 B2 | 4/2007 | Montemer |
| 7,212,615 B2 | 5/2007 | Wolmuth |
| 7,227,936 B2 | 6/2007 | Bookstaff |
| 7,231,405 B2 | 6/2007 | Xia |
| 7,240,110 B2 | 7/2007 | Haitsuka et al. |
| 7,240,290 B2 | 7/2007 | Melideo |
| 7,343,317 B2 * | 3/2008 | Jokinen et al. .............. 705/14.64 |
| 7,363,254 B2 | 4/2008 | Skinner |
| 7,434,175 B2 | 10/2008 | Melideo |
| 7,650,137 B2 * | 1/2010 | Jobs et al. ..................... 455/405 |
| 7,697,894 B2 * | 4/2010 | Zilliacus et al. ............. 455/41.2 |
| 2001/0048737 A1 | 12/2001 | Goldberg et al. |
| 2002/0003867 A1 | 1/2002 | Rothschild et al. |
| 2002/0010616 A1 | 1/2002 | Itzhaki |
| 2002/0026457 A1 | 2/2002 | Jensen |
| 2002/0028681 A1 | 3/2002 | Lee et al. |
| 2002/0057776 A1 | 5/2002 | Dyer |
| 2002/0095331 A1 | 7/2002 | Osman et al. |
| 2002/0107697 A1 | 8/2002 | Jensen |
| 2002/0122547 A1 | 9/2002 | Hinchey et al. |
| 2002/0193094 A1 | 12/2002 | Lawless et al. |
| 2003/0026397 A1 | 2/2003 | McCroskey |
| 2003/0046161 A1 | 3/2003 | Kamangar et al. |
| 2003/0083042 A1 | 5/2003 | Abuhamdeh |
| 2003/0105824 A1 | 6/2003 | Brechner et al. |
| 2003/0195787 A1 | 10/2003 | Brunk et al. |
| 2003/0212600 A1 | 11/2003 | Hood et al. |
| 2003/0220866 A1 | 11/2003 | Pisaris-Henderson |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0010518 A1 | 1/2004 | Montemer |
| 2004/0076403 A1 | 4/2004 | Mankovitz |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0234049 A1 | 11/2004 | Melideo |
| 2004/0235524 A1 | 11/2004 | Abuhamdeh |
| 2004/0247092 A1 | 12/2004 | Timmins et al. |
| 2004/0249649 A1 | 12/2004 | Stratton et al. |
| 2004/0254859 A1 | 12/2004 | Aslanian |
| 2004/0260413 A1 | 12/2004 | Melideo |
| 2005/0018829 A1 | 1/2005 | Baker |
| 2005/0041647 A1 | 2/2005 | Stinnie |
| 2005/0074100 A1 | 4/2005 | Lederman |
| 2005/0076100 A1 | 4/2005 | Armstrong |
| 2005/0080878 A1 | 4/2005 | Cunningham et al. |
| 2005/0096980 A1 | 5/2005 | Koningstein |
| 2005/0100153 A1 | 5/2005 | Pines et al. |
| 2005/0105881 A1 | 5/2005 | Mankovitz |
| 2005/0125416 A1 | 6/2005 | Kirsch et al. |
| 2005/0135387 A1 | 6/2005 | Rychener et al. |
| 2005/0209874 A1 | 9/2005 | Rossini |
| 2005/0240432 A1 | 10/2005 | Jensen |
| 2005/0245241 A1 | 11/2005 | Durand et al. |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0069610 A1 | 3/2006 | Rossini |
| 2006/0106711 A1 | 5/2006 | Melideo |
| 2006/0136310 A1 | 6/2006 | Gonen et al. |
| 2006/0159063 A1 | 7/2006 | Kumar |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0178916 A1 * | 8/2006 | Domnin ............................. 705/5 |
| 2006/0182250 A1 | 8/2006 | Melideo |
| 2006/0247999 A1 | 11/2006 | Gonen et al. |
| 2007/0038507 A1 | 2/2007 | Kumer |
| 2007/0042760 A1 * | 2/2007 | Roth ......................... 455/414.3 |
| 2007/0060173 A1 * | 3/2007 | Ramer et al. ................ 455/456.3 |
| 2007/0100956 A1 | 5/2007 | Kumer |
| 2007/0129054 A1 | 6/2007 | Andronikov et al. |
| 2007/0268858 A1 * | 11/2007 | Soto ................................. 370/328 |
| 2007/0269038 A1 | 11/2007 | Gonen et al. |
| 2008/0059299 A1 * | 3/2008 | Hamoui ........................... 705/14 |
| 2008/0090609 A1 * | 4/2008 | Walter et al. ................ 455/556.2 |

FOREIGN PATENT DOCUMENTS

| | | |
|---|---|---|
| KR | 2005-0086166 | 8/2005 |
| WO | 9847295 | 10/1998 |
| WO | 0057326 | 9/2000 |
| WO | 0127825 | 4/2001 |
| WO | 2001028141 | 4/2001 |

OTHER PUBLICATIONS

PCT International Search Report for PCT/US2008/053316, Jun. 26, 2008.

"AtOnce Talks Up E-mail Marketing Campaigns with ITXC Push to Talk Service," Business Wire, Feb. 26, 2001.

"ITXC Corp and Doubleclick Energize Banner Ads with Web Telephony; Companies Voice-Enable Banner Advertisements Using ITXC Push to Talk Service," Business Wire, Dec. 12, 2000.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

(56) References Cited

OTHER PUBLICATIONS

Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Ingenio, Inc., "FindWhat.com Enters Agreement with Ingenio to Offer Pay Per Call Advertising Platform," press release available at http://www.ingenio.com, Apr. 7, 2004.
Jambo, "Welcome to Jambo—The Leader in Pay-Per-Call Solutions," company information retrieved from http://www.jambo.com, available at least by Oct. 17, 2005.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.

\* cited by examiner

FUNCTIONAL DESCRIPTION OF SYSTEM

─ 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS    scroll down for more listings

Dream Car Rentals    Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold
RENT-A-VETTE
5021 SWENSON STREET
LAS VEGAS, NV 89119
Phone: (702) 555-2692
Fax: (702) 555-2044

ONLINE LISTINGS    scroll down for more listings

Expedia: For All Your Car Rental Needs  http://www.expedia.com
Save with Expedia.com, your one-stop source for flights, hotels, vacation packages, cruises, and rental

FIG. 9

┌─────────────────────────────────────────────────────────────────────┐
| ✉ You just received a call through yellowpages.com – Message (HTML)   _ ☐ ✕ |
| File  Edit  View  Insert  Format  Tools  Actions  Help              |
| ℛ Reply   ℛ Reply to All  ℛ Forward  | 🖨 | ! ↓ | ✕ | ⌾ ▾           |
|─────────────────────────────────────────────────────────────────────|
| From: Yellow Pages.com [customerservices@yellowpages.com]    Sent Mon 9/8/2003 3:16PM |
| To: Darik Wong                                                      |
| CC:                                                                 |
| Subject: You just received a call through yellowpages.com           |
|─────────────────────────────────────────────────────────────────────|
| Dear Davis Law Offices,                                             |
|                                                                     |
| We are pleased to inform you that the customer call you just received from 770-894-1231 was generated |
| from your Yellowpages.com listing. We are pleased to play a part in growing your business and are |
| standing by to offer you a wide range of valuable services to help you achieve your goals. Please contact |
| us at 999-999-9999 if we can be of any further assistance.          |
|                                                                     |
| Best regards,                                                       |
|                                                                     |
| The Team at Yellowpages.com                                         |
└─────────────────────────────────────────────────────────────────────┘

(email window labeled 116)

Create Ad  [?] Help

Your ad is very important. Tell customers exactly what you're selling and why they should call you. Please review our Pay Per Call Ad Guidelines to ensure your ad is accepted and gets new customers calling your business today.

Ad Location Info

Business Name: [          ]  (Sorry, no phone numbers)

☐ Use my Account Information

Address 1: [          ]

Address 2: [          ]  (Optional)

City: [          ]

State: [-Select State- ▽]

Zip Code: [    ]-[    ]

Phone Number: ([    ])[    ]-[    ]  Enter the number where you'd like to receive calls Fax: ([    ])[    ]-[    ]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
- Call today and get $5 off.
- Free consultation – limited time.
- Call now and save 10%.
You'll be able to include more information about your offer on the business profile page. Learn more Marketing Message Line 1: [          ]  (35 characters)

Marketing Message Line 2: [          ]  (35 characters)

METHODS AND APPARATUSES TO CONNECT USERS OF MOBILE DEVICES TO ADVERTISERS

CROSS-REFERENCE TO RELATED APPLICATIONS

The present patent application claims the priority to Provisional U.S. Patent Application Ser. No. 60/888,935, filed Feb. 8, 2007 and entitled "Methods and Apparatuses to Connect Users of Mobile Devices to Advertisers."

The present patent application is related to: copending U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; and U.S. patent application Ser. No. 11/095,853, filed Mar. 30, 2005 and claimed priority from Provisional U.S. Patent Application 60/653,661 filed on Feb. 16, 2005. The parent patent application Ser. No. 11/092,309 is also related to: U.S. patent application Ser. No. 11/014,073, filed Dec. 15, 2004; U.S. patent application Ser. No. 10/872,117, filed Jun. 17, 2004; and, U.S. patent application Ser. No. 11/021,939, filed Dec. 23, 2004, which is a continuation in part application of U.S. patent application Ser. No. 10/679,982, filed Oct. 6, 2003. The present application is also related to: copending U.S. patent application Ser. No. 11/274,453, filed Nov. 14, 2005 and claimed priority from Provisional U.S. Patent application 60/721,793 filed Sep. 28, 2005; U.S. patent application Ser. No. 11/505,225, filed Aug. 15, 2006 and claimed priority from Provisional U.S. Patent application 60/761,929 filed Jan. 24, 2006; and, U.S. patent application Ser. No. 11/536,616, filed Sep. 28, 2006 and claimed priority from Provisional U.S. Patent Application 60/761,972 file Jan. 24, 2006.

The disclosures of the above referenced prior applications are incorporated herein by reference.

TECHNOLOGY FIELD

At least some embodiments of the disclosure relate to communication connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY

Methods and apparatuses to connect a user of a telephony device to a selected one of service providers of a predefined category are described here. Some embodiments are summarized in this section.

One embodiment includes: providing a user interface element on a dial interface of a telephonic device to represent a communication reference associated with a pre-defined category of services; and responsive to a user selection of the user interface element, initiating a request from the telephonic device using the communication reference for a telephone connection to a service provider of the pre-defined category; where the service provider is to be selected from a plurality of service providers of the pre-defined category in response to the request and to be charged in response to a telephone lead connected to the service provider.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 9 shows an example of a search engine result page, which includes an advertisement generated, in accordance with one embodiment of the present invention.

FIG. 10 shows an example of an email alert that is sent to an advertiser, when a call is generated, in accordance with one embodiment of the invention.

FIG. 29 illustrates a user interface for the creation of an advertisement according to one embodiment of the present invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Figure 1:
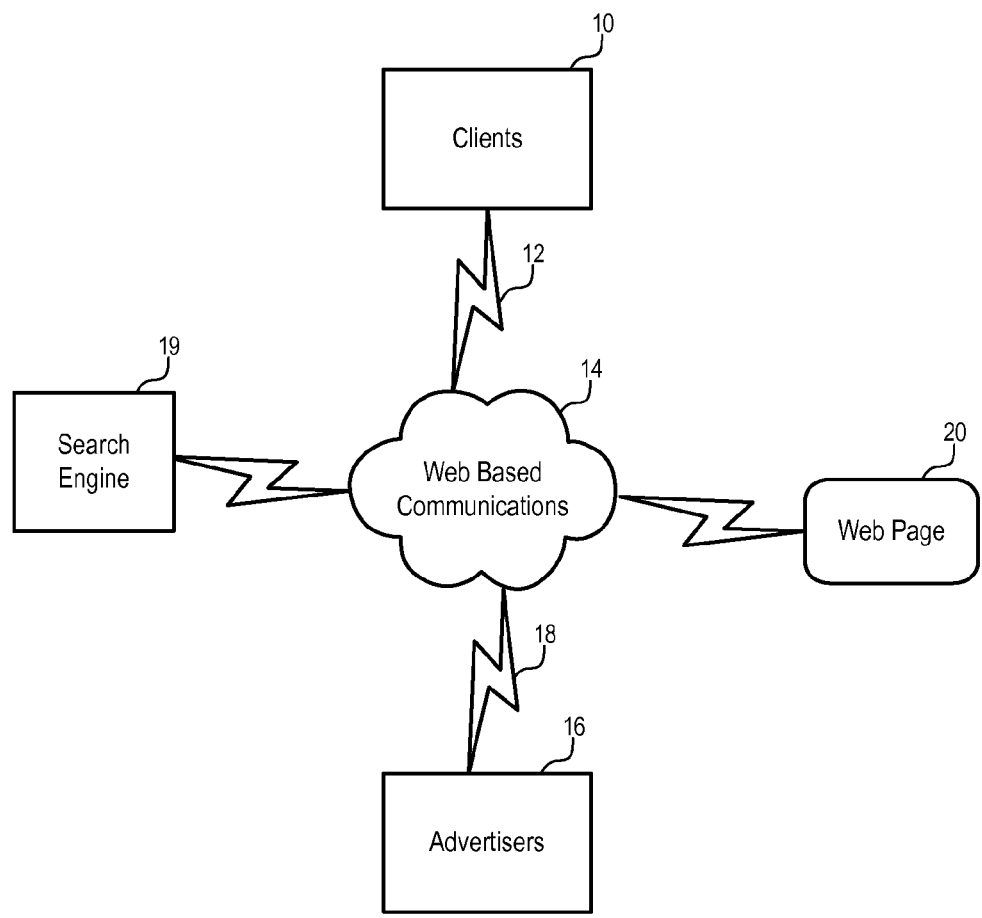
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
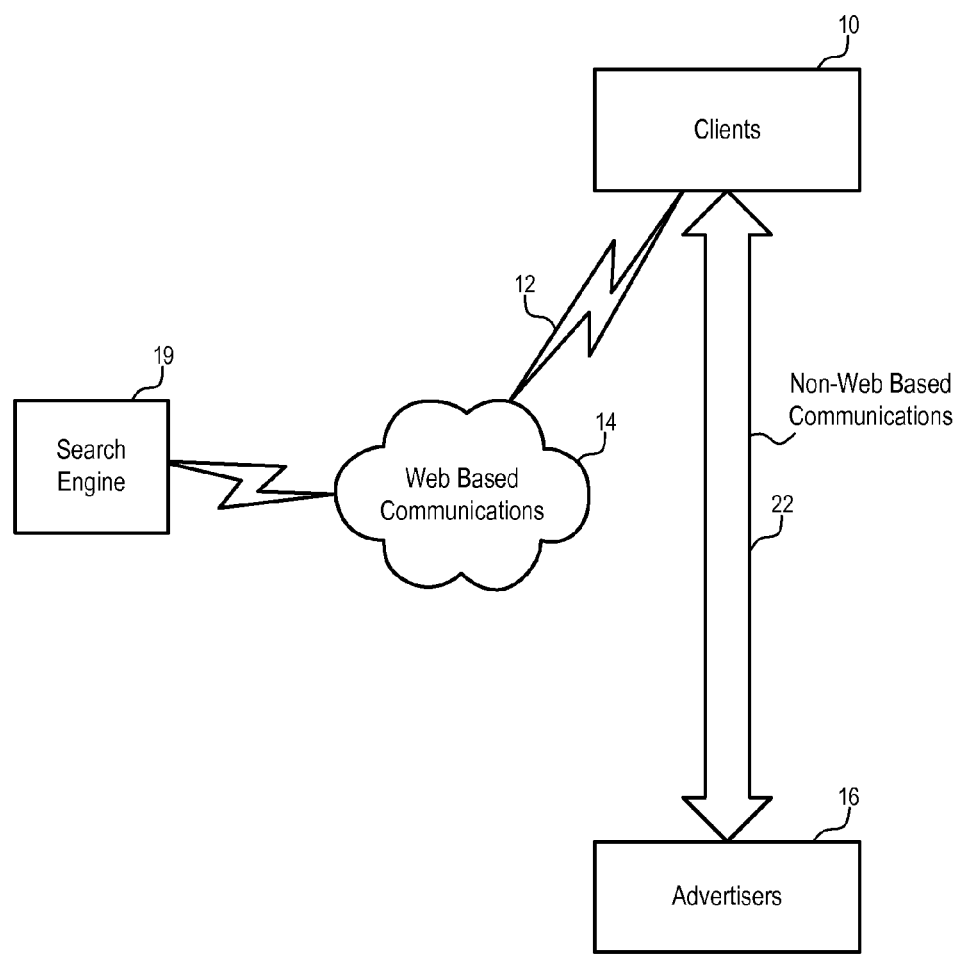
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
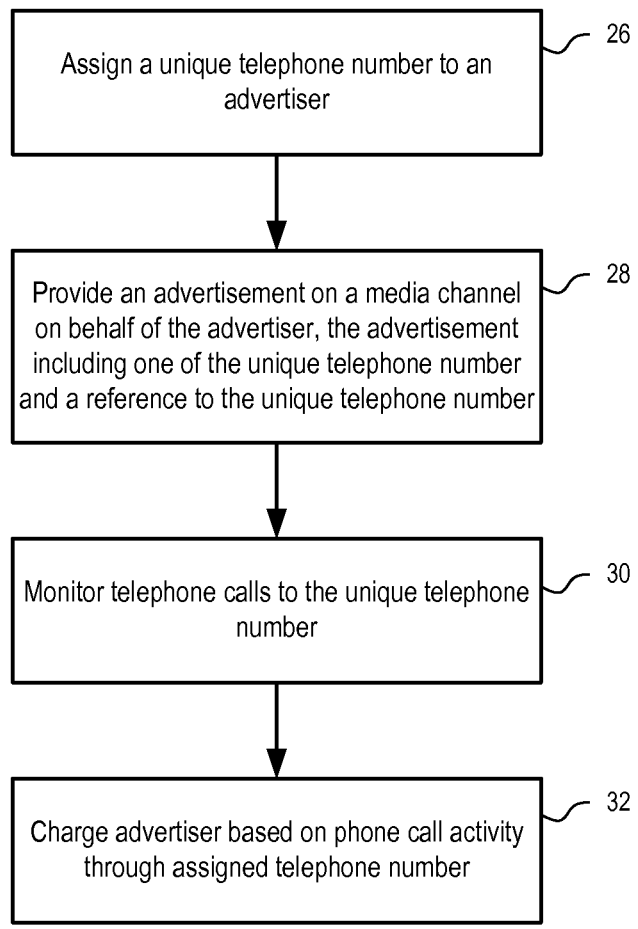
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
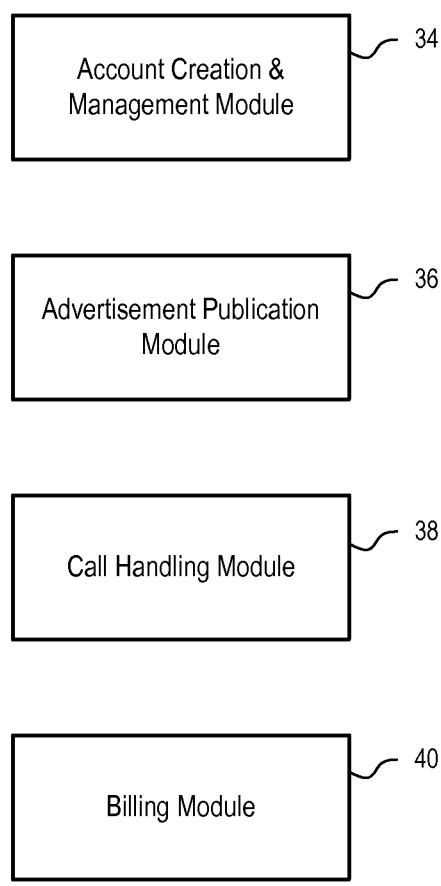
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
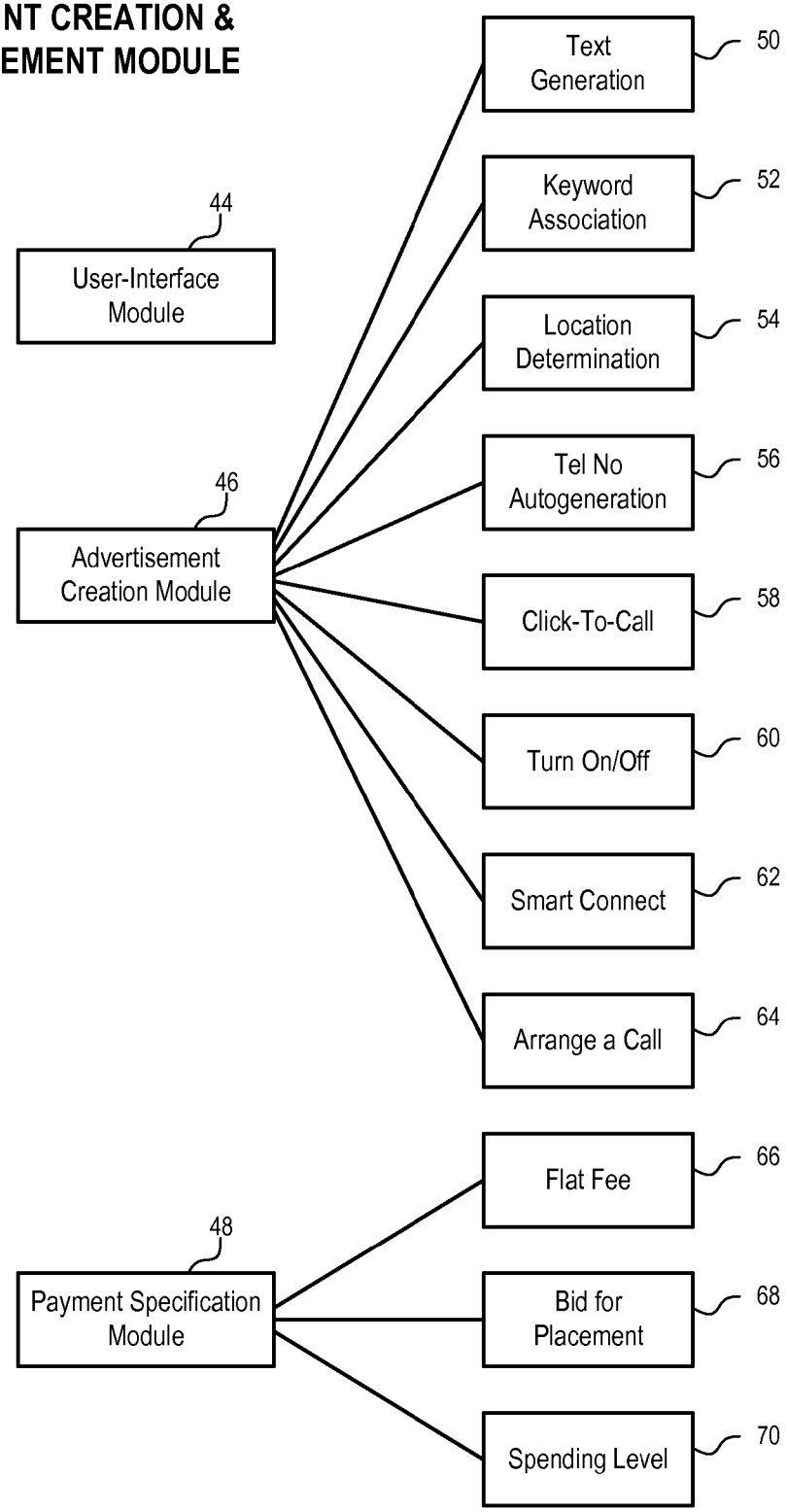
FIG. 5 illustrates the Account Creation and Management module of the system, in greater detail.
Figure 8A:
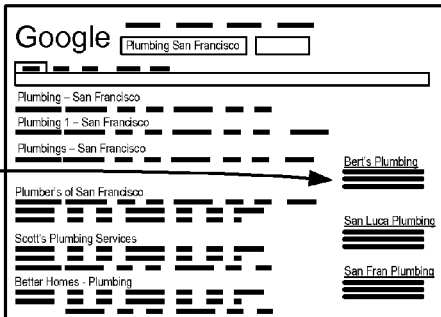
FIG. 8A shows an example of a user interface that may be presented to a user during advertisement creation, in accordance with one embodiment of the present invention.
Figure 8B:
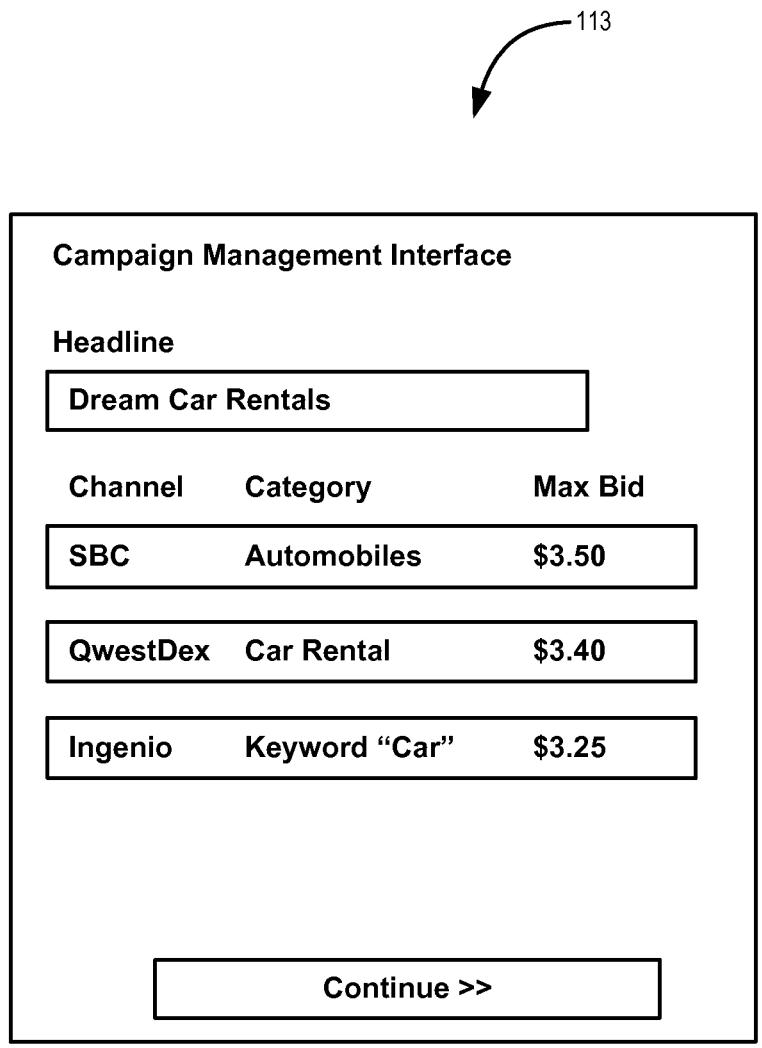
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
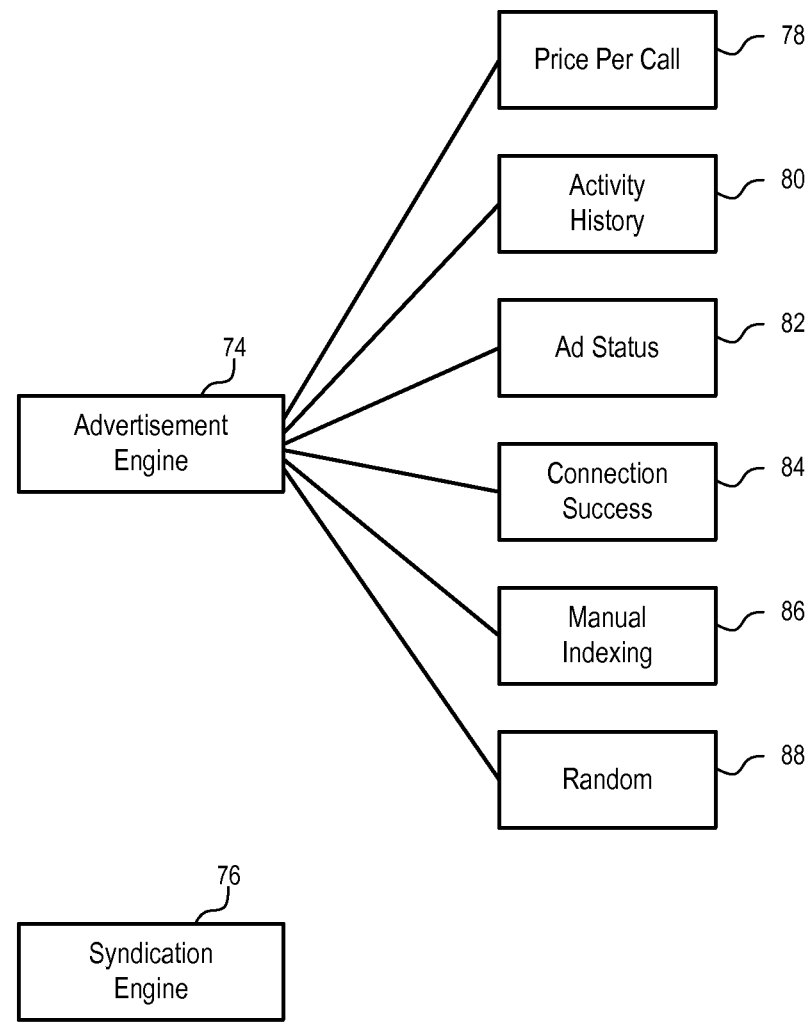
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
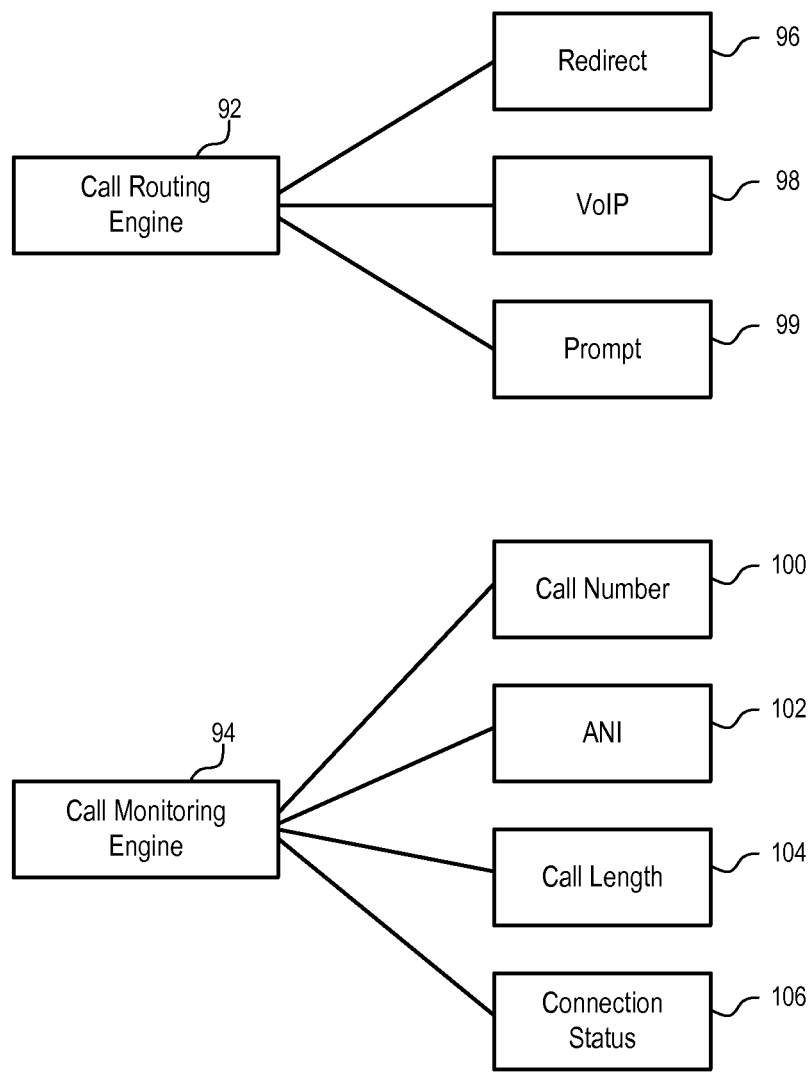
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. In one embodiment, the report provides additional information based on an address lookup of the ANI, including but not limited to demographic, socioeconomic, and psychometric information. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
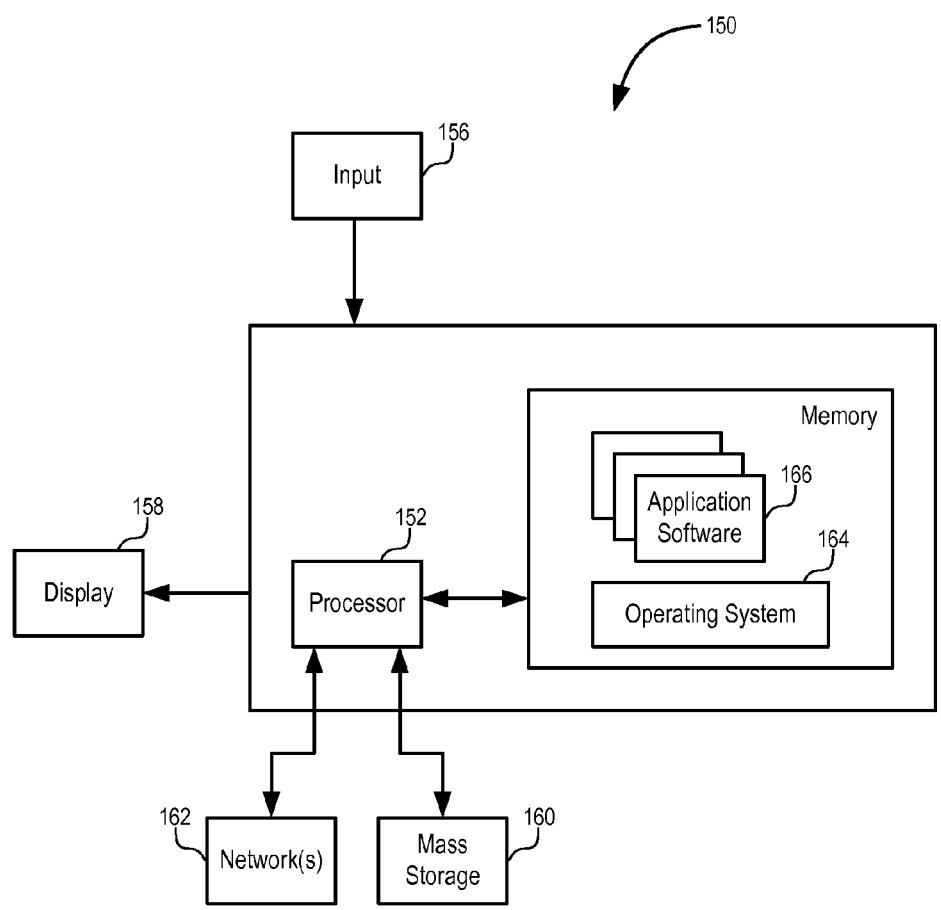
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
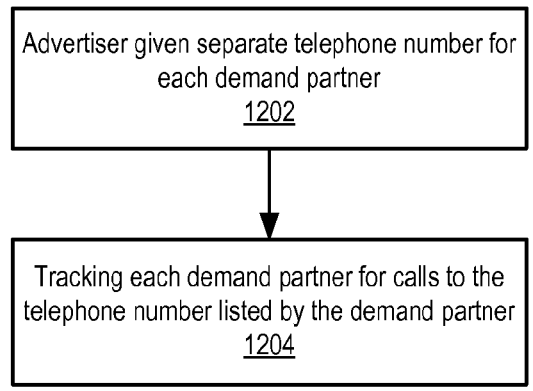
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
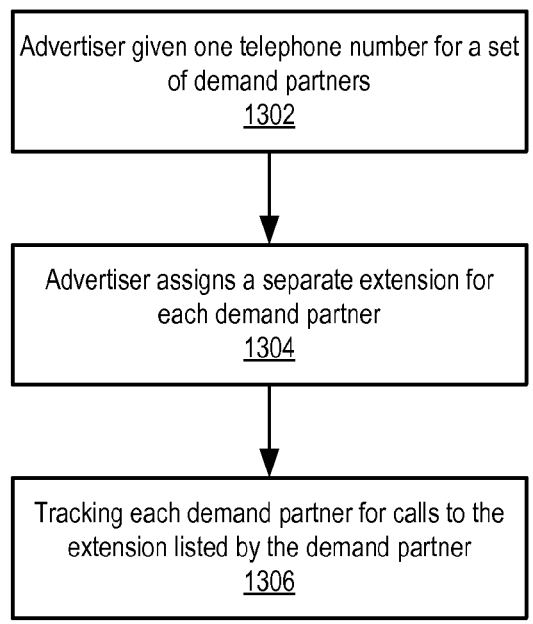

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
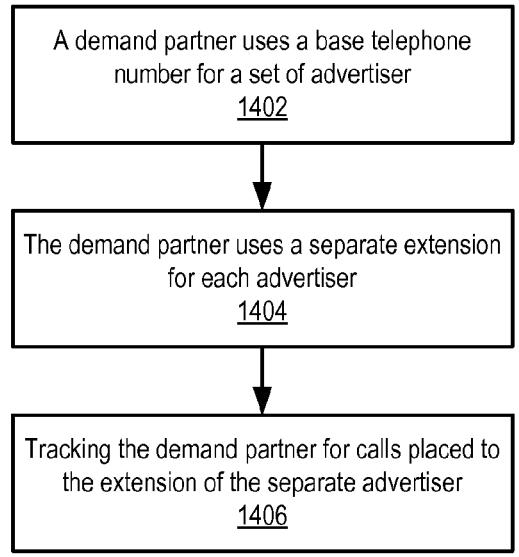

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
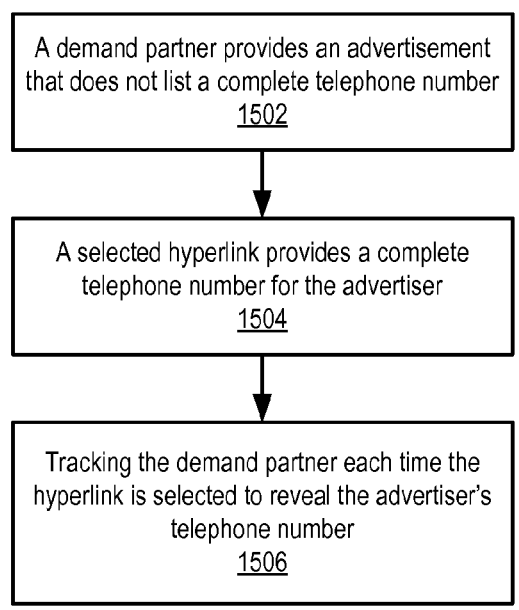

According to another embodiment, a click-to-reveal method is proposed, as described in U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
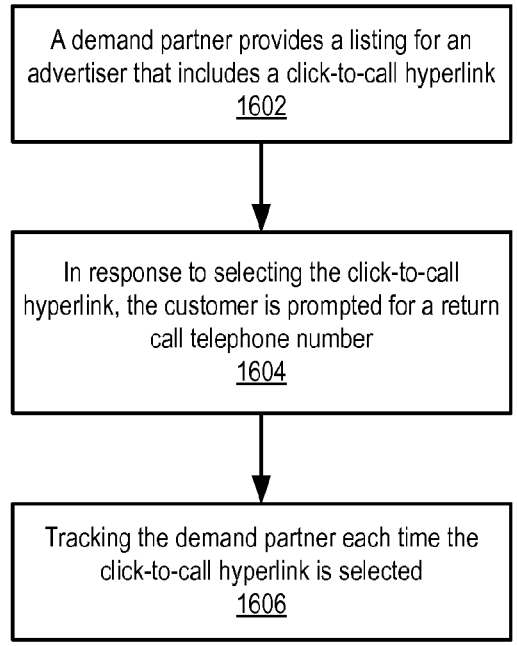

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
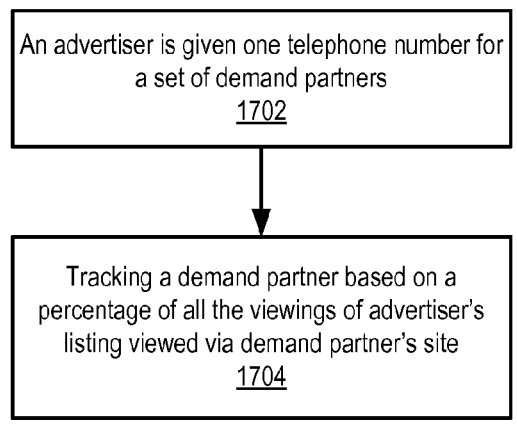

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
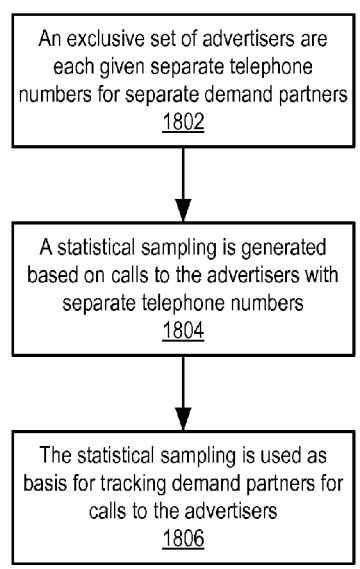

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
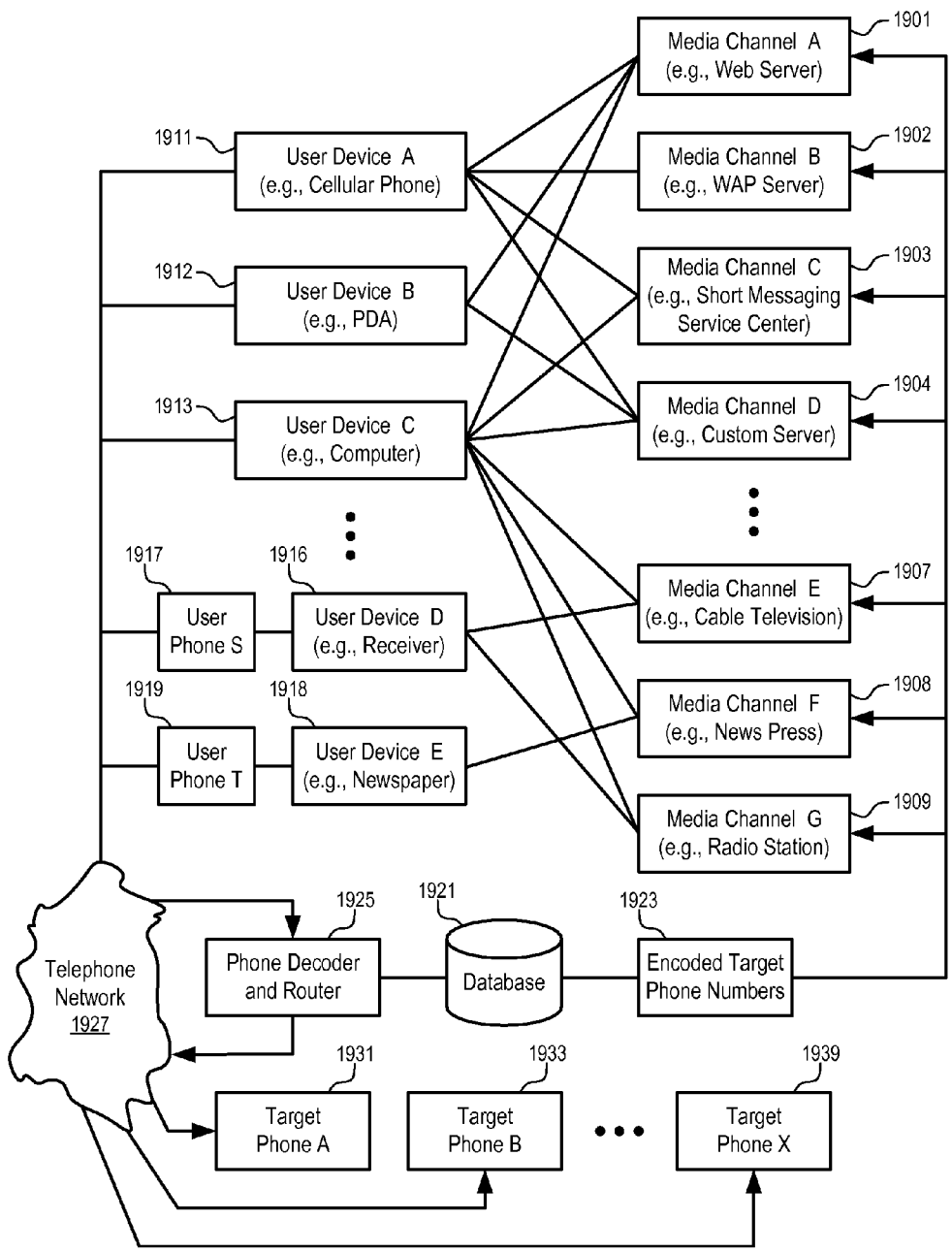
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 20:
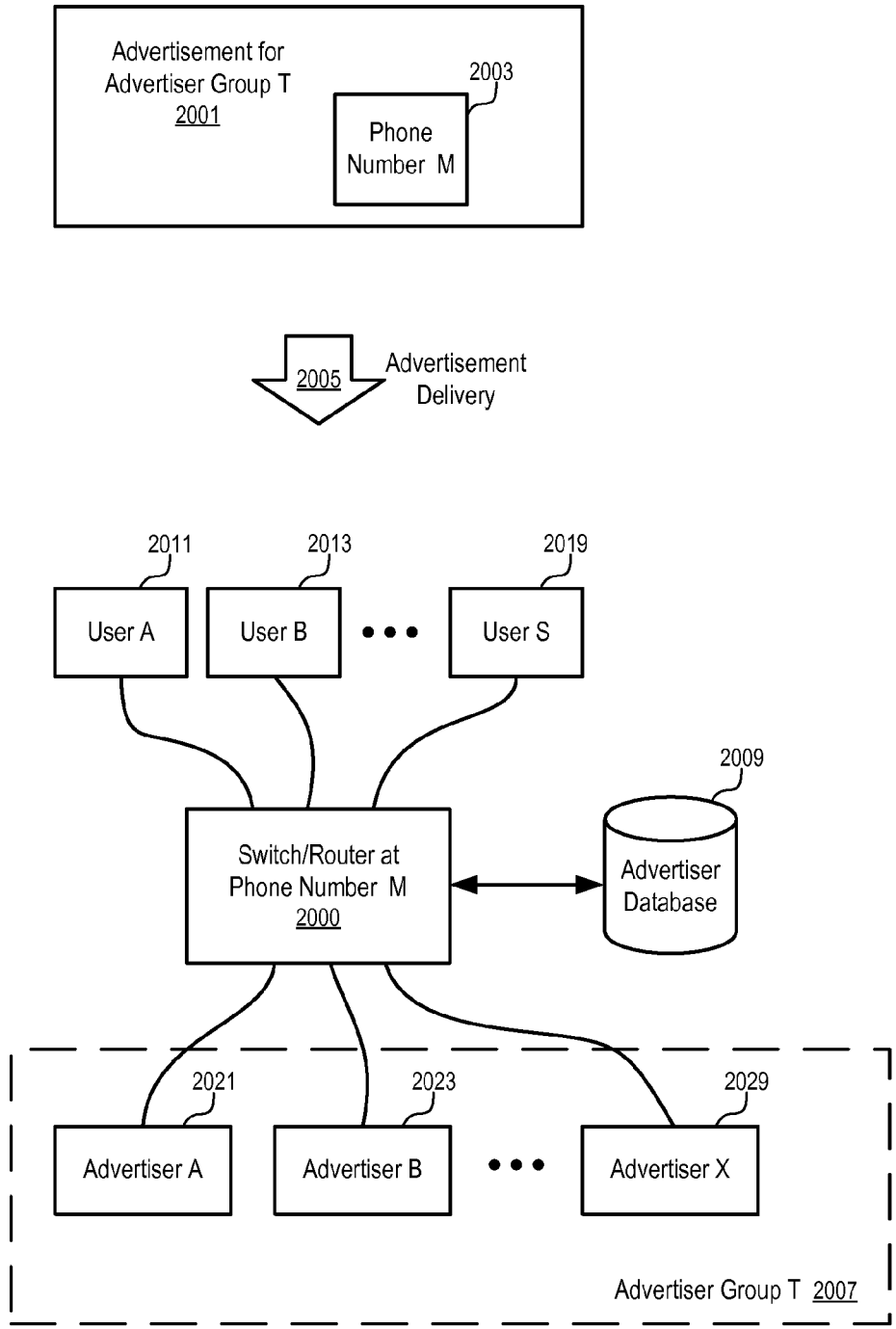
FIG. 20 shows a diagram of a system to make offline selection of advertisers according to one embodiment of the present invention.

FIG. 20 shows a diagram of a system to make offline selection of advertisers according to one embodiment of the present invention.

In FIG. 20, the advertisement (2001) is for an advertiser group T (2007) which includes a number of different advertisers, such as advertiser A (2021), advertiser B (2023), advertiser X (2029), etc. For example, the advertisers of the group may offer the same types of services or products under similar terms and/or prices. Thus, a unified advertisement can be presented on behalf of the entire group. The advertisement delivery (2005) can be in any of the forms known in the art. For example, the advertisement can be delivered through newspaper, radio, television, yellow book, listing service, web search engine, web site banner, WAP, SMS, etc. The advertisement contains phone number M (2003) for the users to initiate a phone call to reach one of the advertisers.

In one embodiment, the advertised phone number (e.g., 2003) can also contain extension digits in addition to toll-free digits. In one embodiment, the extension digits are used to convey additional information such as geography, category, or the ability to trace specific advertising creative (e.g., the call resulted from the advertisement on the billboard on Second Street). In one embodiment, dialing of the extension digits (or some of the extension digits) is optional; if the extension digits are not dialed, the call goes through anyway; and the information corresponding to the extension digits is not collected (or, similar information is extracted/extrapolated from other data sources, such as the phone number from which the call is initiated, etc.).

In one embodiment of the present invention, the phone number M (2003) is not specifically for a particular advertiser at the time the advertisement is presented. Thus, at the time the user initiates the phone call, the target advertiser is yet to be determined. The selection of a particular target advertiser is after the initiation of the phone call.

In one embodiment of the present invention, a switch/router (2000) at the phone number M is used to connect the users to the advertisers dynamically according to the information in the advertiser database (2009). When a user, such as user A (2011), user B (2013), user S (2019), etc., calls the phone number M (2003), the user is connected to the switch/router (2000) first. With or without further user input, the switch/router (2000) connects the call to an advertiser, such as advertiser A (2021), advertiser B (2023), advertiser X (2029), etc. The advertiser is charged based on the telephone calls generated for the advertiser. In one embodiment, the selection of the advertiser is made at the switch/router after the user phone call is received. The switch/router may operate via switching circuits or changing communication data packets.

Alternatively, information about the user phone number and the desire to make the phone call according to the advertised phone number can be transmitted to the switch/router through a communication link other than a phone connection. For example, an email, a fax, an HTTP (HyperText Transfer Protocol)/WAP (Wireless Application Protocol) request, etc., can be used to submit the request for the phone connection. The switch/router then initiates the phone call to the user and the phone call to the selected winning advertiser and bridges the two calls.

Note that the phone number M (2003) may also be encoded in a way so that the information about the media channel which provides the phone number to the user can be decoded, as discussed above. For example, different media channels may be assigned different phone numbers for reaching the same group of advertisers through the switch/router (2000). According to the phone number in the advertisement, the switch/router (2000) can determine the media channel that is creditable for the delivery of the phone number to the users.

In one embodiment of the present invention, a winning advertiser is selected according to the bidding for advertisement. The highest bidder wins the telephone call. The advertisers may adjust their bids anytime through any communication media to balance their chances to get a call resulting from the advertisement and the cost for the advertisement. For example, the advertisers may change their bids through a web site that is connected to the advertiser database, through an email to representatives or automatic email gateways of the advertiser database, through a phone call, a fax, a letter, etc.

Alternatively, the set of highest bidders may be determined; and the calls resulting from the advertisement are distributed to the set of highest bidders in frequencies that are proportional to their bid amounts. Alternatively, one from the set of highest bidders is further selected according other criteria, such as the geographic distance from the advertisers to the callers. Alternatively, other criteria, such as the matching of geographic service area to the location of the callers, are used to select a set of candidates; and the candidates are then ranked according to the prices specified by the advertisers for the pay for performance advertisement, where the performance is measured in terms of phone calls resulting from the advertisement.

In one embodiment, the availability of the advertisers to answer the call is also considered. In one embodiment, if the top-ranking (e.g., according to the bidding) advertiser receives a call and doesn't pick up after a certain amount of time (e.g. 30 seconds), the call is automatically routed to the second-highest ranking advertiser, and so on. In another embodiment, the missed call is routed to a human concierge who transfers the call to the appropriate available advertiser or information source.

In one embodiment, the advertiser group includes subgroups of advertisers for different geographic areas. Indications of geographic areas of interest to the callers can be used in the selection process.

In one embodiment, the selection of the geographic area is made when the user selects the phone number from the advertisements. The phone number is encoded with geographic area information such that, when the phone number is dialed, the geographic area information can be automatically decoded from the phone number dialed; and the geographic area information can be used to rank the advertisers and/or eliminate the advertisers that are not for the corresponding geographic areas.

In one embodiment, the geographic area information is determined from the location of the user phone. Alternatively, the user may specify the geographic area in the phone call to the switch/router (2000), through an automated system or through human concierges. Further, the user may specify requirements other than geographic areas for selecting the winning advertiser. Further details are provided below.

Figure 21:
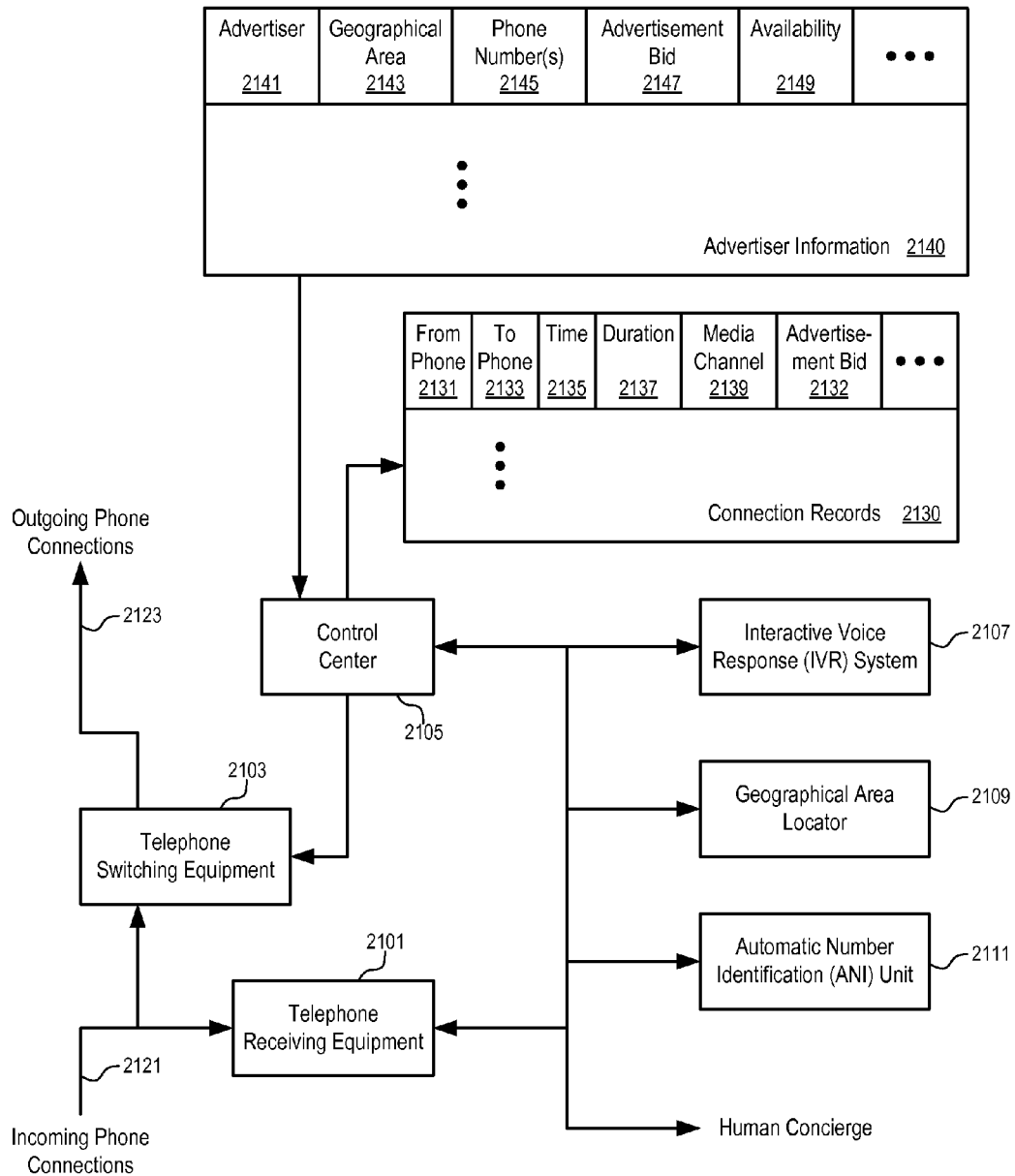
FIG. 21 shows a diagram of a telephone connection system for offline selection of advertisers according to one embodiment of the present invention.

FIG. 21 shows a diagram of a telephone connection system for offline selection of advertisers according to one embodiment of the present invention.

In FIG. 21, when a user calls an advertised telephone number, the phone call is connected to the telephone receiving equipment (2101). The telephone receiving equipment (2101) is connected to the control center (2105) to operate the telephone switching equipment (2103), which selectively connects incoming phone connections (2121) from the users and outgoing phone connections (2123) to the winning advertisers.

In one embodiment, the telephone receiving equipment (2101) and the telephone switching equipment (2103) are circuit switched, including Private Branch Exchange (PBX) and a dedicated voice network. Alternatively, the telephone receiving equipment (2101) and the telephone switching equipment (2103) may be packet switched, including Internet Protocol (IP) based PBX, a data communication network and a gateway. In general, various telephonic techniques known in the art can be used.

When the telephone receiving equipment (2101) picks up a phone call, the control center (2105) determines whether or not further information is needed and/or can be obtained from the caller. For example, to determine a geographical area of interest, the control center (2105) can instruct the interactive voice response (IVR) system (2107) to prompt the caller to key in the desired zip code. In one embodiment, Interactive Voice Response (IVR) is a telephony technology in which one may use a touch-tone telephone to interact with a database to acquire information from or enter data into the database without the help of a human concierge.

Further, the control center may direct the IVR system (2107) to prompt the caller to specify further criteria based on the advertiser information (2140). For example, when the phone number is for a group of mortgage brokers, the user may be directed to select loan sizes, loan types, etc.

Alternatively, the control center (2105) may instruct the geographic area locator (2109) to determine a geographic area from which the call is initiated. For example, the geographic area locator may use the cellular position system to determine the location of a cellular phone, or use a satellite/pseudolite positioning system to determine the location of a mobile device. Pseudolites are ground-based transmitters similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site, in which the mobile device can communicate to a based station, can be used to determine a rough position of the cellular phone. In general, any method used by a cellular phone provider to get location information (e.g., for emergency service) can be used.

The control center (2105) may also instruct the automatic number identification (ANI) unit (2111) to determine the phone number of the incoming call and look up the geographic area information from the database for the phone numbers.

Alternatively, the control center (2105) may connect the phone call temporally to a human concierge who can help the caller to specify a selection criterion (or criteria).

In one embodiment of the present invention, the control center (2105) uses a number of different types of information to select the winning advertiser based on the advertiser information (2140).

In one embodiment, the advertiser information (2140) include the identities of the advertisers (e.g., 2141), the geographic areas (e.g., 2143) of the advertisers, the phone number(s) (e.g., 2145) of the advertisers, the placement bids (e.g., 2147) of the advertisers, the availability statuses (e.g., 2149) of the advertisers, etc. In an alternative embodiment, more or less fields can be used for the advertiser information. For example, keywords of the advertisements and/or categories of the products and/or services advertised in the advertisements can be included in the database of advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

In one embodiment, in view of the caller's implicitly or explicitly specified requirements (e.g., the geographic area, the loan type, loan size, etc., if there is any), the control center ranks the advertisers according to the current advertiser information. For example, the control center may eliminate the advertisers that are not available or do not meet the caller's requirements and sort the remaining candidates according to the bid for advertisement. The highest bidder in the remaining candidates is the winner. Alternatively, other types of sorting criteria can be used. For example, an indicator of the degree of matching between the caller's requirements can be weighted according to the advertisement bid to generate an indicator for selecting the winner.

After the winning advertiser is determined, the control center (2105) can instruct the telephone switching equipment (2103) to connect the incoming phone call to the phone number of the winning advertiser. The control center (2105) then creates a record entry in connection records (2130) to indicate the connection made for the advertiser. For example, a record entry may include information such as the from phone number (2131), the to phone number (2133), the time the connection is made (2135), the duration of the connection (2137), the media channel (2139) responsible for delivering the advertisement to the caller, the advertisement bid (2132) of the advertiser at the time of the connection, etc. Other information, such as whether or not a human concierge is involved, can also be recorded. In an alternative embodiment, more or less fields can be used for the connection records.

In one embodiment, the recorded connection information is used to generate invoice to bill the advertisers. An account of the advertiser may be debited automatically for the connection. Alternatively, a payment for the advertisement is collected automatically through an electronic system for the connection.

Figure 22:
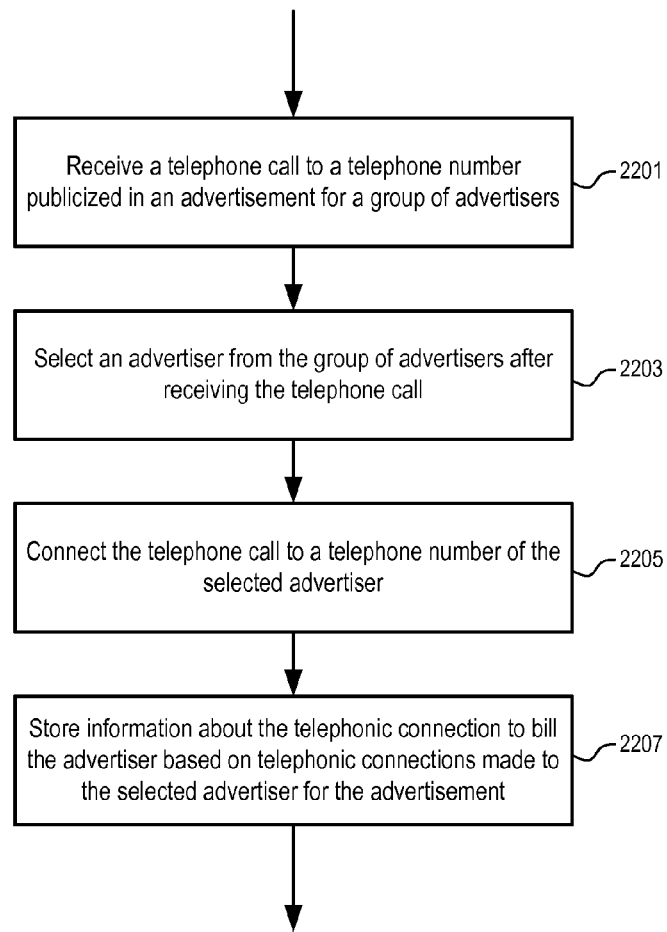
FIGS. 22-25 show flow diagrams of making and tracking phone connections according to embodiments of the present invention.
Figure 23:
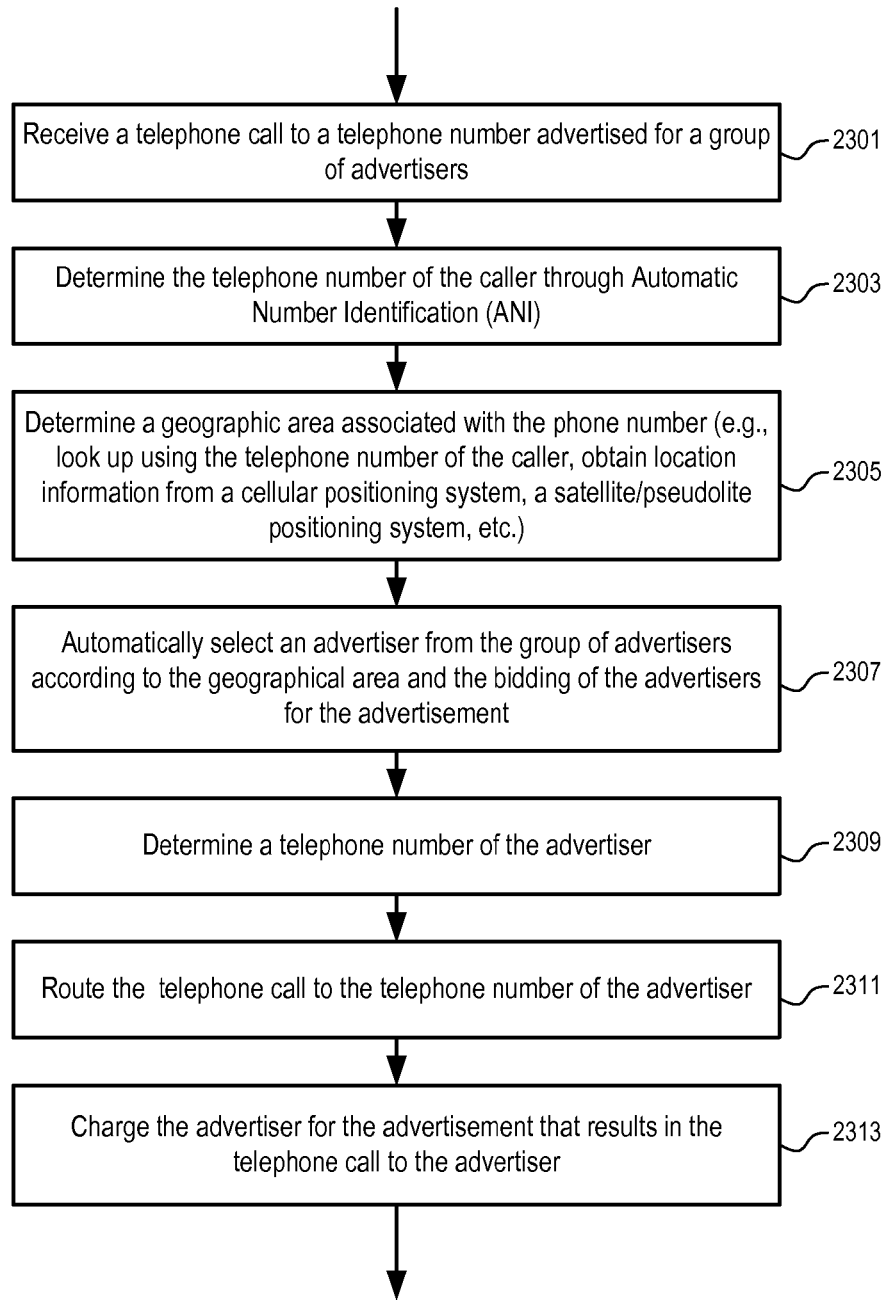
Figure 24:
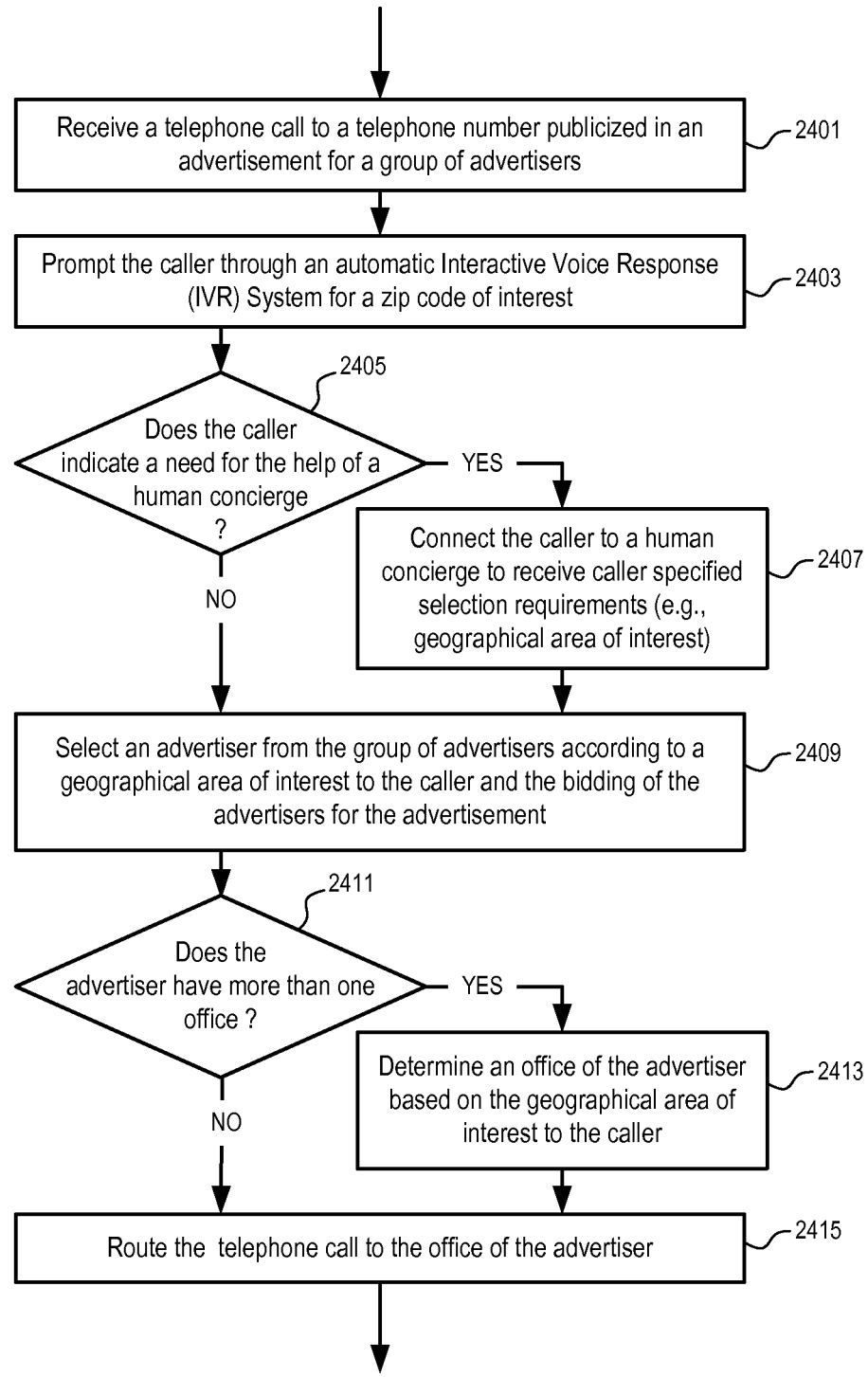

FIGS. 22-24 show flow diagrams of making and tracking phone connections according to embodiments of the present invention.

In FIG. 22, operation 2201 receives a telephone call to a telephone number publicized in an advertisement for a group of advertisers. Operation 2203 selects an advertiser from the group of advertisers after receiving the telephone call. Operation 2205 connects the telephone call to a telephone number of the selected advertiser. Operation 2207 stores information about the telephonic connection to bill the advertiser based on telephonic connections made to the selected advertiser for the advertisement. In one embodiment, the geographic area of interest to the caller is determined, which is used in selecting the advertiser as the receiver of the telephone call.

In FIG. 23, after operation 2301 receives a telephone call to a telephone number advertised for a group of advertisers, operation 2303 determines the telephone number of the caller through Automatic Number Identification (ANI). Operation 2305 determines a geographic area associated with the phone number (e.g., look up using the telephone number of the caller, obtain location information from a cellular positioning system, a satellite/pseudolite positioning system, etc.). Operation 2307 automatically selects an advertiser from the group of advertisers according to the geographical area and the bidding of the advertisers for the advertisement. Operation 2309 determines a telephone number of the advertiser. Operation 2311 routes the telephone call to the telephone number of the advertiser. Operation 2313 charges the advertiser for the advertisement that results in the telephone call to the advertiser.

For example, in one embodiment, the system looks at the phone number (obtained through ANI) of the incoming call and automatically routes it to the highest bidding mortgage broker in the geographic area of the phone number.

In FIG. 24, after operation 2401 receives a telephone call to a telephone number publicized in an advertisement for a group of advertisers, operation 2403 prompts the caller through an automatic Interactive Voice Response (IVR) System for a zip code of interest.

If operation 2405 determines that the caller indicates a need for the help of a human concierge, operation 2407 connects the caller to a human concierge to receive caller specified selection requirements (e.g., geographical area of interest, loan type, loan size, etc.).

Operation 2409 selects an advertiser from the group of advertisers according to a geographical area of interest to the caller and the bidding of the advertisers for the advertisement.

If operation 2411 determines that the advertiser has more than one office, operation 2413 determines an office of the advertiser based on the geographical area of interest to the caller.

Operation 2415 routes the telephone call to the office of the advertiser.

For example, in one embodiment, a customer is prompted on the telephone by an automatic IVR to key in the desired zip code. The system then routes the call to the highest bidding mortgage broker in that geographic area.

For example, in one embodiment, the customer is connected to a human concierge who asks for the desired geographic area and routes the call to the highest bidding mortgage broker in the desired geographic area.

For example, in one embodiment, a large national account which has local regional offices around the country, geography is ascertained using one of the above discussed methods and the call is then routed to the local office that best matches the geography.

In one embodiment of the present invention, an advertisement is for one single advertiser that has a number of different locations. The selection of the location of the advertiser and the corresponding target phone number is made at the time a phone call is received at a switch/router; and the selection may be automatic based on ANI or location information determined from a positioning system, or semi-automatic based on user interaction with an automated IVR, or non-automatic based on the user interaction with a human concierge. Alternatively, the advertisement can be for a group of different advertisers, some of which have different locations/branches in a large geographic area (e.g., a country, around the world, etc.).

In one embodiment, before an incoming call is connected to a selected advertiser (e.g., selected according to price bids of the advertisers for the phone lead, and/or a geographic location/area, and/or other criteria which may be explicitly or implicitly specified by the caller, etc.), no further advertisement information is presented in the telephone call to the caller. In one embodiment, no input is required from the caller to connect the incoming call, which is connected by the server to the highest bidding advertiser of the group associated with the telephone number that the caller dialed.

Alternatively, in one embodiment, further advertisement information may be presented to the caller on behalf of the individual advertisers, after the phone call from the caller is received and before the phone call is forwarded/routed/connected/bridged to an advertiser, to assist the caller in selecting an advertiser from a set of candidates. In one embodiment, detailed, differentiating advertisements are delivered to the callers who are already in the process of making a telephonic connection to one of the advertisers (e.g., service providers).

In one embodiment, advertisements for the individual advertisers are to be presented as voice/audio messages transmitted over the telephonic connection between the server and the caller, before the server further connects the call to a selected advertiser. For example, one or more advertisements as in the form of a pre-recorded voice message, and/or the output of a speech synthesizer using a text-to-speech system, can be presented to the caller over the telephonic connection.

Alternatively, in one embodiment, advertisements for the individual advertisers are presented in a visual form to the caller through the telephone connection, or through a separate data connection.

For example, through the telephone connection, a data stream can be provided from the server to the user device of the caller to present a document, or a user interface, that shows one or more listings of advertisers so that the user can select one to connect. For example, when the telephonic connection between the caller and the server is based on a Voice over Internet Protocol (VoIP) system, the server can provide the data stream to the terminal used by the caller to show advertisements, such as displaying the advertisements within a window of the VoIP client application, or within a separate web browser window.

In one embodiment, a VoIP phone is designed to display messages in additional to transmitting the voice/audio messages. For example, the VoIP phone is designed to receive and display video images or still images during the phone connection. Advertisements/listings can be presented as video images or still images. For example, the VoIP phone can be designed to receive and display data (e.g., text message, web page, WAP page, or data of a custom application). The server can stream the advertisement data to the VoIP phone over the connection for display.

In one embodiment, the selection of the caller is transmitted to the server as a voice/audio message. For example, according to the visual and/or the voice/audio presentation of the advertisements/listings, the caller can make the selection using a voice command (e.g., say an ID number of the advertisements/listings, or the name of the listings), or pressing a key to generate an audio signal (e.g., a Dual Tone Multi-Frequency (DTMF) signal) to indicate the selection.

Alternatively, in one embodiment, the selection of the caller is transmitted in a digital form, such as a text message, a web request, a WAP request, or a request in a custom communication protocol (e.g., SIP) when a custom application is used to display the advertisements/listings.

For example, a VoIP phone is designed to transmit data generated according to user input received at the input device of the phone (e.g., a touch screen, a keyboard, a keypad, etc.) After the caller views the advertisements/listings during the phone call, the caller can make a selection (e.g., click) to request the connection to the corresponding advertiser.

Further, a phone designed for a circuit switched network can also be designed to have at least some of the communications capabilities via the telephonic connection discussed above. For example, a phone for a circuit switched network can have a circuitry to detect audio signals that represent data transmitted over the phone connection and display the advertisements/listings according to the data received.

In one embodiment, the advertisements/listings are presented over a data connection separate from the telephonic connection. For example, a data-enabled phone (e.g., a cellular phone, a mobile phone, a Bluetooth phone, a software phone, etc.) can establish a separate data connection with the server to allow the display of the advertisements/listings. For example, the data-enable phone can have an application designed to display the advertisements/listings when the phone number of the server is dialed. The advertisements/listings may be pre-loaded, or downloaded after the dialing of the phone number of the server. In one embodiment, the data connection is a two-way communication channel, which allows the phone to transmit the user selection and/or other user input (e.g., search criteria) in a digital format.

In one embodiment, the server selectively determines one or more candidates. A representation of the candidates is then presented to the caller for selection/confirmation. The representation can be delivered for visual and/or audio presentation.

In one embodiment, the candidates are selected at least partially based on the price bids of the advertisers. In one embodiment, the selection of the candidates is further based on a search request of the caller. For example, the caller may ask for a particular advertiser by name; and the server can then determine the requested advertiser and one or more alternative advertisers that are similar to the requested advertiser. For example, the caller may specify a price range charged by the service providers; and the server can then determine one or more candidates based on the price range and price bides of the advertisers.

In one embodiment, the telephone number of the server is advertised for a group of advertisers (e.g., "Call 1-800-PLUMBER for plumbers in your area", "Call 1-800-MYLOCAL for top local merchants in your neighborhood: plumbing, roofing, taxi, pizza, etc."), and/or for the capability of the server to determine an advertiser requested over the phone.

For example, after the caller calls the telephone number of the server, the caller may specify one or more criteria to search for a suitable advertiser/service provider. After the search is performed, the server presents one or more listings/advertisements of the candidates to the phone of the caller for display. The caller can select a desired one to connect or request more candidates. Alternatively, the candidates can be read out to the caller one at a time for the user to select. In one embodiment, the presentation sequence, or position, of the candidates are at least partially determined by the price bids of the candidates for the phone lead.

Figure 25:
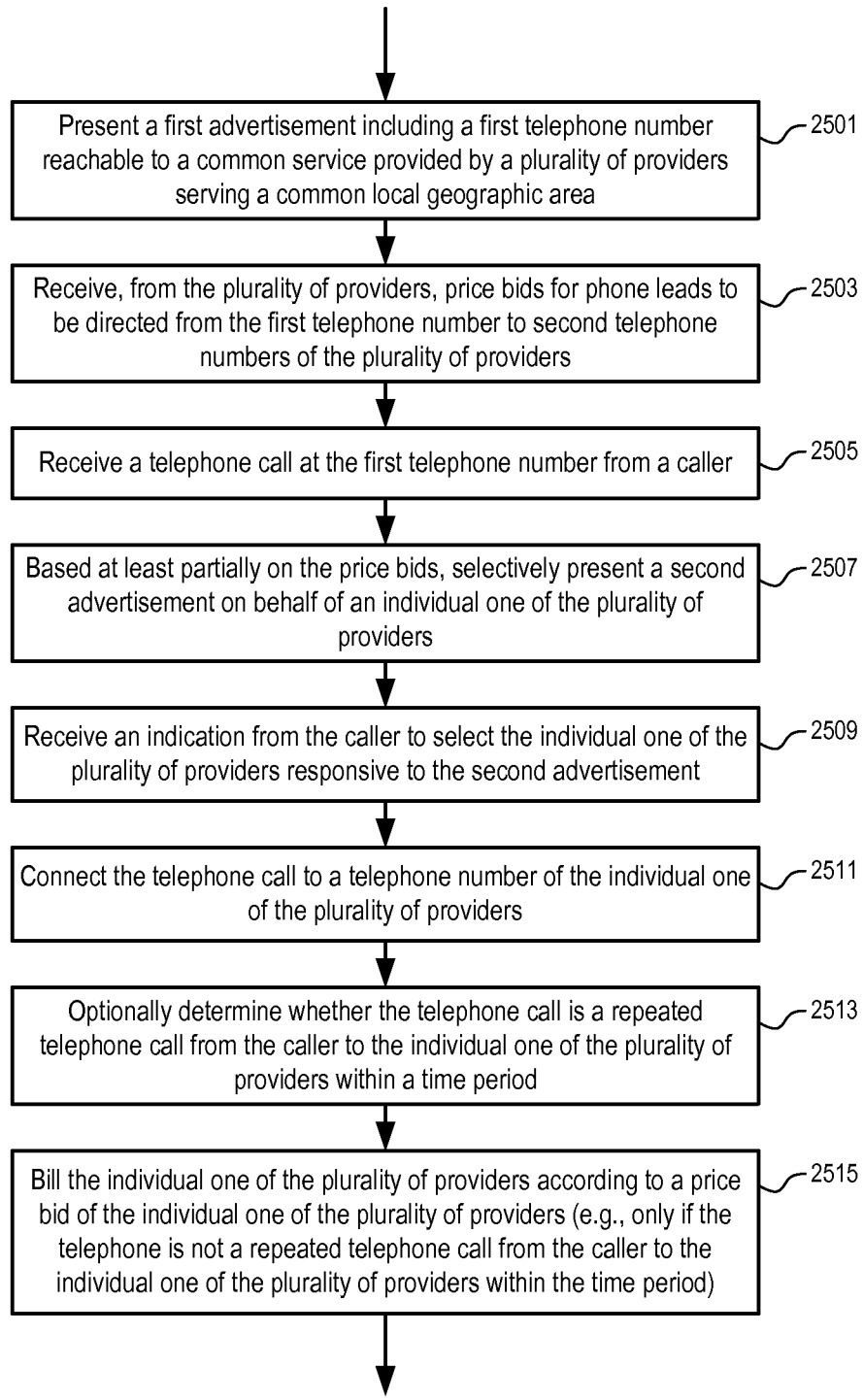

FIG. 25 shows a flow diagram of making phone connections according to one embodiment of the present invention. In FIG. 25, operation 2501 presents a first advertisement including a first telephone number reachable to a common service provided by a plurality of providers serving a common local geographic area. The advertisement may be presented in a variety of media channels, such as web pages, emails, books, magazines, newspapers, television programs, text messages, multi-media messages, instant messages, billboards, refrigerator magnets, etc. In one embodiment, the first advertisement does not specifically identify any individual of the providers. In one embodiment, the first advertisement does not specifically represent any individual providers. In one embodiment, the first advertisement identifies a portion of the providers as examples. In one embodiment, the first advertisement identifies and describes the providers as a whole.

In one embodiment, the first telephone number is designed to reach a variety of callees based on a search request presented by the caller after telephonic connection between the caller and the server is established.

From the plurality of providers, operation 2503 receives price bids for phone leads to be directed from the first telephone number to second telephone numbers of the plurality of providers. In one embodiment, the price bids are used to rank the similar advertisers selective presentation to the caller of the first telephone number. For example, the price bids may be used to select the top one or two of currently available providers for presentation to the caller. The providers who are not currently available to talk to the caller may be excluded from the list, or be presented after a further request from the caller.

In one embodiment, the availability information of the providers to talk to the caller is collected from the providers. For example, the providers may specify the schedule (e.g., hours and days) for taking the calls and/or specify the current availability information through a communication channel (e.g., a phone line, a web page, a short message/SMS message, etc.).

In one embodiment, the price bids are used to compute a ranking indicator to sort and select the top candidates for the caller.

For example, after operation 2505 receives a telephone call at the first telephone number from a caller, operation 2507 selectively presents a second advertisement on behalf of an individual one of the plurality of providers, based at least partially on the price bids. In one embodiment, the second advertisement is specific for an individual provider. In one embodiment, the server may provide more or less advertisement/listing information depending on the preference of the caller. For example, the server may present a list of names of the providers, or present a list of names with brief descriptions, or present a list of names with discount offers from the corresponding providers, or a present a list of names with detailed advertisements of the corresponding providers.

In one embodiment, the advertisements for multiple providers are presented sequentially (e.g., as output of a speech synthesizer one after another, or as flash cards one after another, or as a scrolling list), or substantially simultaneously with different positions on a display (e.g., as a text listing, a web page, a WAP page, etc.).

After operation 2509 receives an indication from the caller to select the individual one of the plurality of providers responsive to the second advertisement, operation 2511 connects the telephone call to a telephone number of the individual one of the plurality of providers.

Optionally, operation 2513 determines whether the telephone call is a repeated telephone call from the caller to the individual one of the plurality of providers within a time period. In one embodiment, the provider is waived charges for leads (calls) from searchers/customers who have called recently (e.g., within an hour, a day, a week, etc.).

Operation 2517 bills the individual one of the plurality of providers according to a price bid of the individual one of the plurality of providers (e.g., only if the telephone is not a repeated telephone call from the caller to the individual one of the plurality of providers within the time period).

In one embodiment, after a telephone call is received at a second telephone number from a caller, the telephone call is connected to a first telephone number of a first entity who provides a price bid for a phone lead to be directed to the first telephone number of the first entity. The first entity is then billed for the telephone call connected to the first telephone number according to the price bid in response to a determination that the telephone is not a repeated telephone call from the caller to the first entity within a time period.

In one embodiment, after an input is received from the caller during the telephone call, the first telephone number of the first entity is determined based at least partially on the input from the caller. For example, the input from the caller can specify one or more criteria which can be used to select the first telephone number from a plurality of telephone numbers of different entities.

In one embodiment, options are displayed to the caller for the selection of one from the plurality of telephone numbers of different entities during the telephone call. For example, a list of advertisements/listings is transmitted to the caller for selection during the telephone call. The transmission may be through the same telephonic connection between the caller and the server or a separate data connection.

In one embodiment, one or more advertisements, including an advertisement of the first entity, are presented individually for one or more advertisers during the telephone call and prior to connecting, such that the caller has the opportunity to select one.

In one embodiment, prior to the telephone call, an advertisement including the second telephone number is presented on behalf of a plurality of entities as a whole on a media channel, such as in a web page, email, book, magazine, newspaper, television program, text message, multi-media message, instant message, or on a billboard, refrigerator magnet, etc.

In one embodiment, the second telephone number is presented in an advertisement on behalf of a plurality of entities. A plurality of price bids are received from the plurality of entities, which can be used to rank the advertisers in making individual presentations for the advertisers during the telephone call. After the call is successfully connected to the first telephone number of the first entity, the first entity is billed for the telephone call connected to the first telephone number according to the price bid, in response to the determination that the telephone is not a repeated telephone call from the caller to the first entity within the time period. In one embodiment, the time period is predetermined and in the order of hour, day, or week.

In one embodiment, the caller can specify an indication of a geographical area of interest to the caller so that the server can select the plurality of entities that service the geographical area of interest to the caller. For example, the caller can provide a zip code over the telephone connection to indicate the geographical area to the server.

In one embodiment, a geographical location of the caller from the telephone call is determined to determine a geographical area of interest to the caller. The geographical location of the caller can be determined based on an Automatic Number Identification (ANI) service, a cellular positioning system, or a satellite positioning system.

In one embodiment, the advertisement advertises a common service provided by a plurality of entities in a specific geographic area, such as Los Angeles.

In one embodiment, information, such as brief description, discount information, qualification summary, etc., is received from the first entity and presented to the caller during the telephone call on behalf of the first entity. The caller can provide a selection indication in response to receiving such information.

In one embodiment, a search request is received from the caller during the telephone call and before the telephone call is connected to the first telephone number. After a search is performed according to the search request, the search result is selectively presented to the caller. When the user selects an item in the search result which corresponds to the first telephone number, the telephone call is connected to the first telephone number. In one embodiment, the search result is selectively presented on behalf of the first entity based at least partially on the price bid.

In one embodiment, the telephone call is connected to the first telephone number without revealing the first telephone number to the caller. For example, the server makes a separate phone call to the first telephone number and then joins the call from the caller with the separate phone call to connect the caller and the first entity. Alternatively, the first telephone number can be provided to the caller during the phone call so that the caller may avoid calling the second telephone number to reach the first entity.

Figure 26:
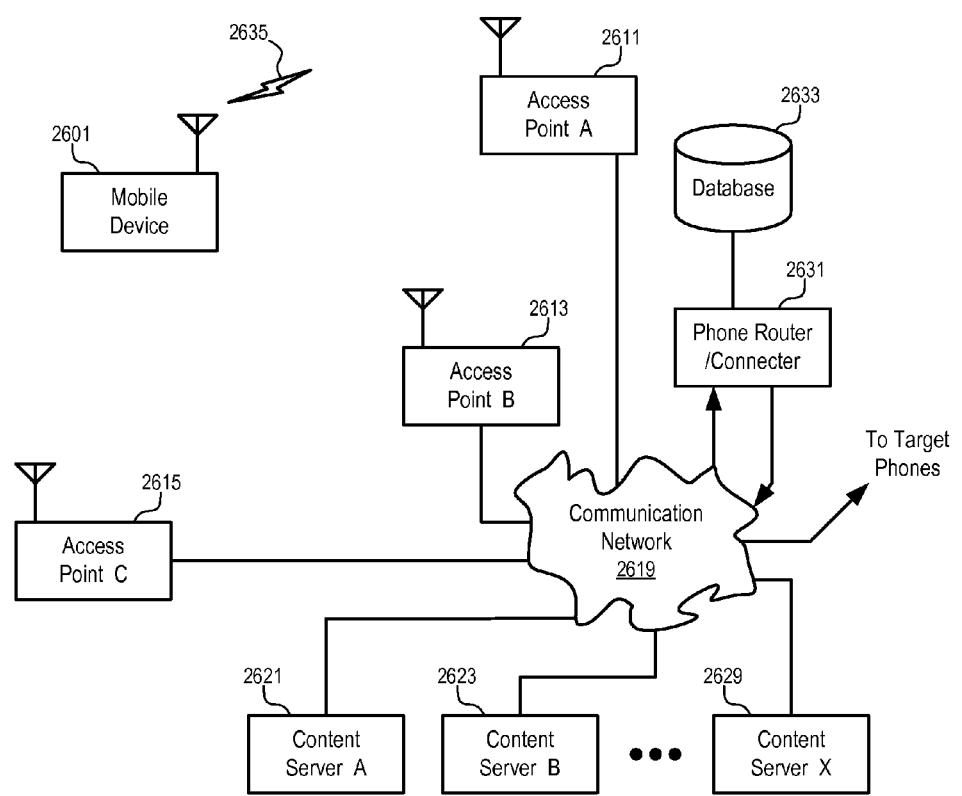
FIG. 26 shows a diagram of a system to make and track phone connections from a mobile device according to one embodiment of the present invention.

FIG. 26 shows a diagram of a system to make and track phone connections from a mobile device according to one embodiment of the present invention.

In FIG. 26, a mobile device (2601) accesses content server A (2621), content server B (2623), content server X (2629), etc., through a wireless link (2635) to a access point, such as access point A (2611), access point B (2613), and access point C (2615). In general, the access points may be of different types. For example, the access point may be a cellular base station, an access point for wireless local area network (e.g., a WiFi access point), an access point for wireless personal area network (e.g., a Bluetooth access point), etc. The access point connects the mobile device to the content servers through a communication network (2619), which may include the Internet, an intranet, a local area network, a public switched telephone network (PSTN), private communication networks, etc.

In one embodiment, the content servers provide encoded target phone numbers, which when dialed connect the mobile device to the phone router/connecter (2631) which used the database (2633) to decode the encoded information and/or store the information about the phone call in the database (2633). The router/connecter (2631) further connects the mobile device to the target phones. Alternatively, the router/connecter (2631) may dial phone calls to the mobile device and the corresponding target phone and then join/bridge the phone calls to connect the mobile device and the target phone.

In one embodiment of the present invention, location-dependent content information is delivered from a content server to the mobile device. The user may enter the location manually (e.g., through text input or voice input which is processed through a speech recognition system). The content information may be presented on a display screen or using an audio channel by playing prompts or audio files or through a text to speech system.

Alternatively, the location of the mobile device may be determined automatically, which is then used to determine the location-dependent content information. For example, the location of the mobile device may be determined through a Global Positioning System (GPS) receiver that is connected to, or built within, the mobile device.

A location of a cellular phone can also be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

An access point for a wireless local area network or a wireless personal area network typically has a small coverage area. Based on the location of the access point, location information (e.g., the city, or more precise location information, such as latitude and longitude) can be obtained.

Further, ANI can also be used to determine the location information. Although the location information determined from ANI may not represent a correct position of a mobile device, content information about the location determined from ANI may still be of interest to the user.

In one embodiment of the present invention, when the user performs a search for information which may be location dependent, the location automatically determined for the mobile device is used with the search request. For example, when the user search for "hotels" without specifying a location using an SMS-based search, the city in which the mobile device is located is determined; and a pay-per-call list of hotels in the city is sent via SMS to the mobile device.

In one example, the user may search for "dentists" in a custom client application; and a custom server application provides a pay-per-call list of "dentists" close to the current position of the mobile device.

In one example, the user may search in a web page or a WAP page for a particular subject. The return results include one or more pay-per-call advertisements to be presented in a browser running in the mobile device.

In one embodiment of the present invention, certain content information is automatically channeled into the mobile device when the mobile device enters into a wireless access zone. For example, when the mobile device enters into a commercial district, pay-per-call lists of various nearby points of interest, such as hotels, movie theaters, restaurants, etc., can be automatically presented on the mobile device, according to user preferences.

In one embodiment of the present invention, a user may search for particular types of experts, businesses, institutions, persons, etc. When the user is interested in calling one selected entity (e.g., an expert, a doctor, a restaurant), the mobile device can automatically dial the encoded phone number of the entity without the user manually dialing the number; and the phone router/connecter decodes the information and connects the mobile device to the phone of the selected entity. Alternatively, the phone number of the mobile device may be determined (e.g., through ANI, or user input, or user preference setting); and the phone connector connects phone calls to both the mobile device and the phone of the selected entity to connect the user to the selected entity. In such a process, the identity of the mobile device may be kept anonymous from the selected entity; and/or the identity of the selected entity may be kept anonymous from the user of the mobile device.

Figure 27:
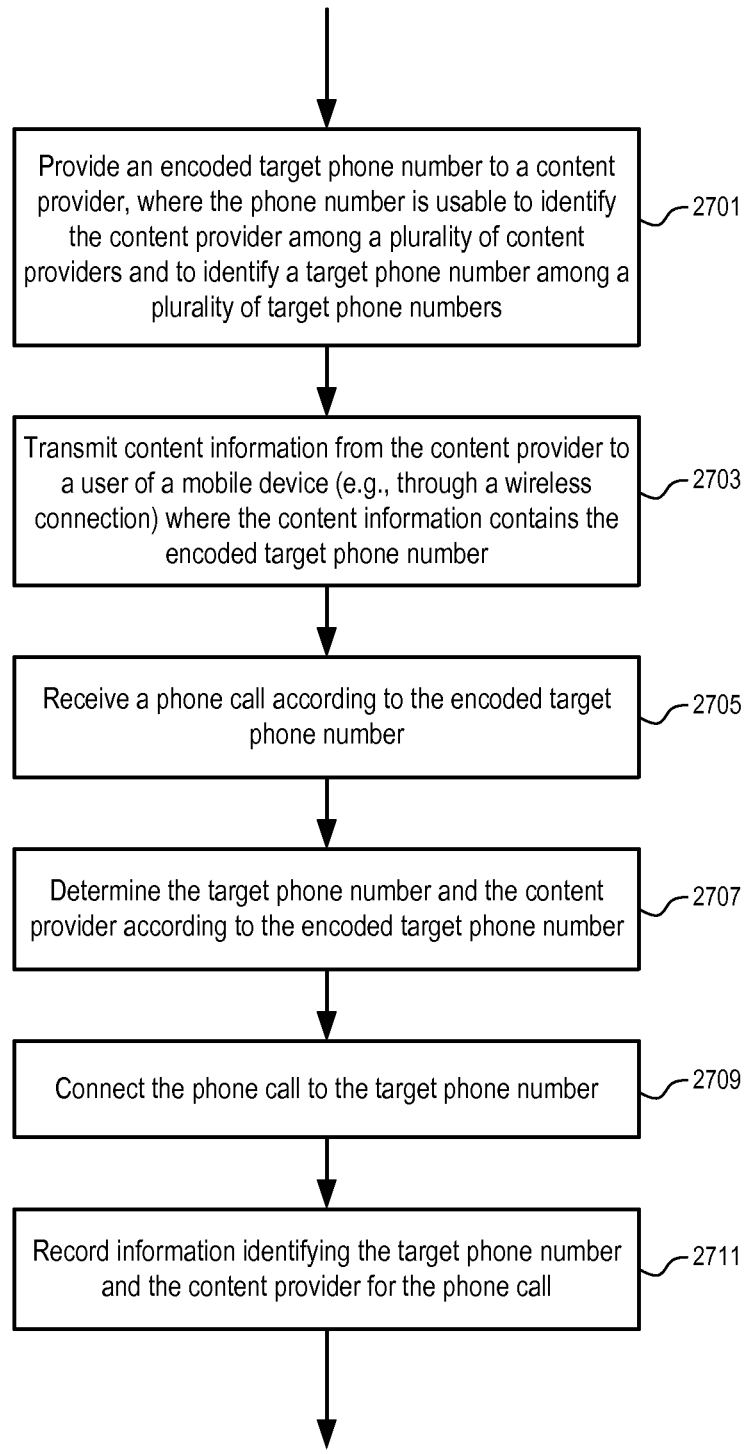
FIGS. 27-28 show flow diagrams of making and tracking phone connections according to embodiments of the present invention.
Figure 28:
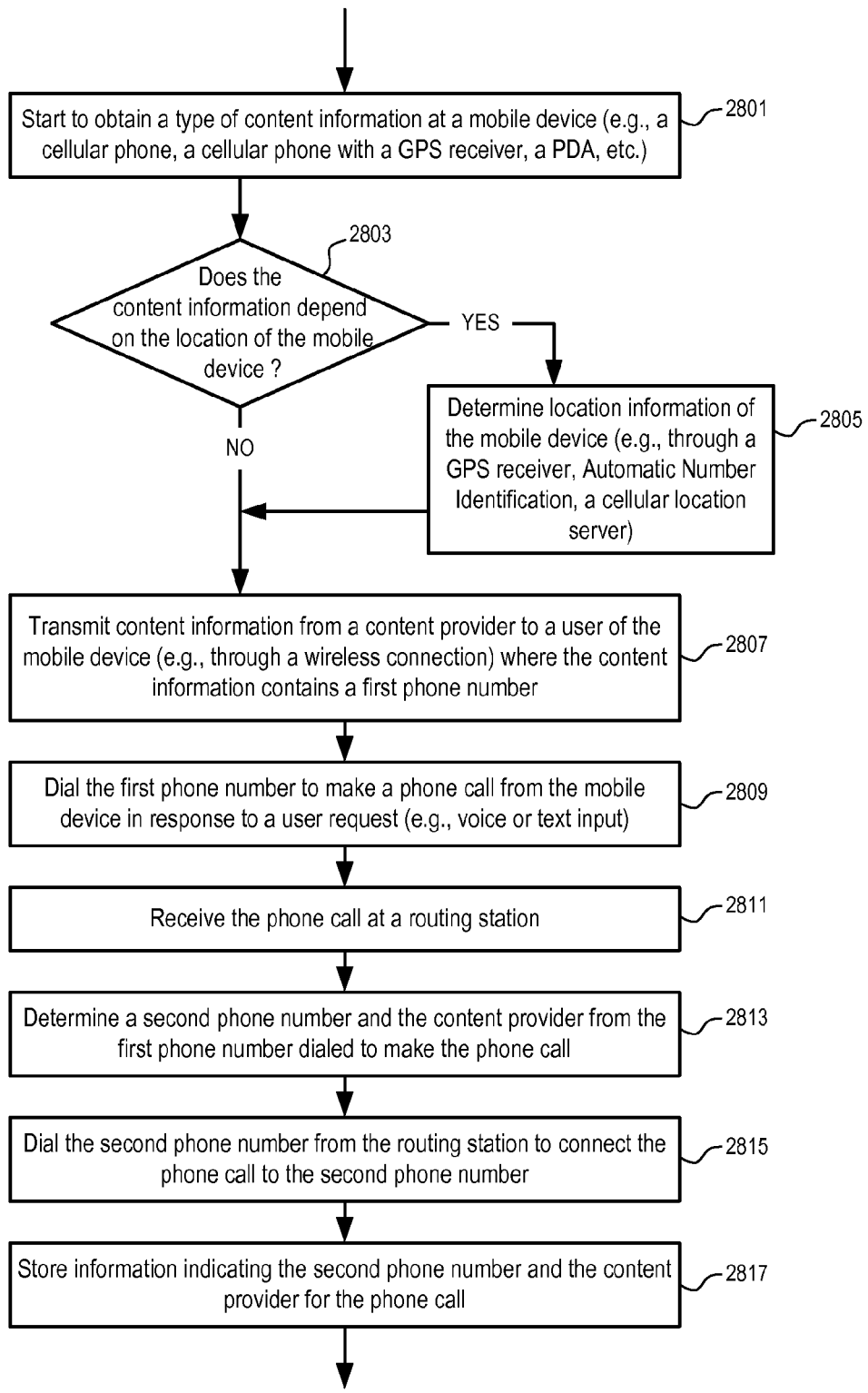

FIGS. 27-28 show flow diagrams of making and tracking phone connections according to embodiments of the present invention.

In FIG. 27, operation 2701 provides an encoded target phone number to a content provider, where the phone number is usable to identify the content provider among a plurality of content providers and to identify a target phone number among a plurality of target phone numbers.

Operation 2703 transmits content information from the content provider to a user of a mobile device (e.g., through a wireless connection) where the content information contains the encoded target phone number. The content information may include pay-per-call advertisements, lists of experts, lists of points of interests, etc.

After operation 2705 receives a phone call according to the encoded target phone number, operation 2707 determines the target phone number and the content provider according to the encoded target phone number; and operation 2709 connect the phone call to the target phone number.

Operation 2711 records information identifying the target phone number and the content provider for the phone call. The recorded information can be used to bill for advertisements and/or for making phone connections, provide credit/compensation for the content provider, and provide information for fine-tuning advertisement operations.

In FIG. 28, operation 2801 starts to obtain a type of content information at a mobile device (e.g., a cellular phone, a cellular phone with a GPS receiver, a PDA, etc.)

If operation 2803 determines the content information depends on the location of the mobile device, operation 2805 determines location information of the mobile device (e.g., through a GPS receiver, Automatic Number Identification, a cellular location server). The location may be determined at the mobile station or determined at a server station.

Operation 2807 transmits content information from a content provider to a user of the mobile device (e.g., through a wireless connection) where the content information contains a first phone number.

Operation 2809 dials the first phone number to make a phone call from the mobile device in response to a user request (e.g., voice or text input or click). In one embodiment the mobile device dials the first phone number without the user manually dialing the individual digits of the first phone number.

After operation 2811 receives the phone call at a routing station, operation 2813 determines a second phone number and the content provider from the first phone number dialed to make the phone call. Operation 2815 dials the second phone number from the routing station to connect the phone call to the second phone number.

Operation 2817 stores information indicating the second phone number and the content provider for the phone call. The second phone number can be used to bill for the connection; and the content provider can be credited/compensated for providing the first phone number to the mobile device.

FIG. 29 illustrates a user interface for the creation of an advertisement according to one embodiment of the present invention. In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer) when the audio advertisement is needed. In one embodiment, the machine synthesized audio recording are stored in the database for a period of time and deleted if not used after a predetermined period of time, or when the usage of the audio advertisement is lower than a threshold.

FIG. 29 illustrates an interface (2901) which allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation-limited time," and "Call now and save 10%."

In one embodiment, a short audio advertisement is based on the concise marketing message (e.g., two sentences, each having a length limit, such as 35 characters). The concise marketing message can be read by a human to generated a recorded audio file for the short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. The visual component of the advertisement can be sent to the customer via an SMS message (e.g., in response to a request from the customer), via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web, the short audio advertisement can also be included; and the audio advertisement is played automatically or after the user selects the advertisement.

In FIG. 29, the interface (2901) may be implemented as a web page. Alternatively, an advertisement may submit the advertising content via a custom client application, or via a message gateway (e.g., an instant message, an email, an SMS message, etc.).

One embodiment includes a speed-dial feature on a mobile phone for connecting the mobile phone to an advertiser of a Pay Per Call advertisement. In one embodiment, the interface of a cellular phone is designed to have one or more buttons configured for accessing frequently-used services, such as Taxi, Pizza, Florist, Plumber, Electrician, Dentist, etc. In one embodiment, the buttons are static, permanent part of the dial interface for convenient access by the mobile user. The speed-dial buttons can be implemented in software, hardware or in combination of software and hardware.

In one embodiment, when a user activates a pre-configured speed-dial button on a cellular phone, the user is connected to the highest-bidding pay-per-call advertiser in the category (e.g., Taxi, Pizza, Florist, Plumber, Electrician, or Dentist) using the cellular phone. In one embodiment, the advertiser is selected based not only on the bid prices of pay-per-call advertisements but also on other conditions such as geographic area, preferences of the user, etc.

In one embodiment, additional information, such as the user's age, demographics, psychographics, preferences, etc., can also be provided from the mobile device (or from the telecommunication carrier of the mobile device) to the connection provider so that the mobile user can be connected to the best matching advertiser/merchant/service provider.

In one embodiment, the advertiser is selected based at least in part on matching the geographic service area of the advertisers to the need (implied or explicitly specified) of the user. For example, the geographic location information of the cell tower that is in communication with the cellular phone can be used to determine a geographic area in which the user needs the service; and the determined geographic area can be used in selecting the advertiser to which the cellular phone is to be connected. In one embodiment, the mobile device collects the geographic area information of the cell tower and passes this geographic area information with the service category to a connection provider for a connection to a selected advertiser. Alternatively, cell tower can be configured to pass this geographic area information to the connection provider. Alternatively, a cellular communication carrier can pass this geographic area information to the connection provider.

In one embodiment, the desired geographic service area is determined based on the phone number of the caller (e.g., determined via an Automatic Number Identification (ANI) service). In one embodiment, the user is connected to an Interactive Voice Response (IVR) system, which prompts the user to say or enter the zip code of the desired geographic service area.

In one embodiment, the mobile device can communicate with the connection provider using Internet Protocol (IP); and an IP address associated with the mobile device can be used to determine/estimate the desired geographic service area. For example, when the mobile device places a SIP call to the connection provider (e.g., via a connection to a local area network, a local area wireless network, or a wide area wireless network, etc.) in response to the selection of a speed-dial button, the IP address of the mobile device used for placing the SIP call can be used to estimate the geographic area in which the service is desired.

In one embodiment, the cellular phone uses the data communication capability to transmit the geographic area information, the selected service area, and/or other user preferences for the selection of the advertiser; and the data communication capability is distinct and separate from the telephone connection. Alternatively, the data can be transmitted via a telephone connection between the mobile device and the connection provider (e.g., via Dual Tone Multi-Frequency (DTMF) signals). Alternatively, the data can be an integrated part of a VoIP-based call.

In one embodiment, different service categories are assigned different telephone numbers without extensions. When different service categories are selected, different telephone numbers are called; and the connection provider determines the service categories based on the telephone numbers dialed at the mobile phone. Alternatively, different extensions can be used to indicate the different service categories.

In one embodiment, the mobile phone is configured to combine a number of data fields, such as the selected service category, the desired geographic service area, and/or other preferences of the mobile user, to generate an extension which is to be decoded by the connection provider to recover the respective data fields.

In one embodiment, a connection server is configured to provide a confirmation prompt to ensure that the user is being routed to the service in the proper geographic area. For example, the connection server may be designed to provide the prompt: "You are about to be connected to a taxi provider in the X region. To select a different region, press #."

In other embodiments, the call placed via the speed-dial feature is connected first to an IVR of a connection provider, which allows the user to specify further criteria for the selection of the advertiser. For example, the IVR system may prompt: "For general-hygiene dentists, press 1. For oral surgeons, press 2 . . . ".

In one embodiment, the connection provider also has a database of service providers who are not bidding advertisers in the service categories. When there is no matching bidder in a particular category (e.g., service providers in a selected category in the geographic service area of interest to the mobile user), one of the service providers who are not bidding advertisers can be selected. Thus, the connection provider can connect the user to a suitable merchant in that category even though they are not an advertiser. The system can fill its database with such merchants to ensure that the system has the full coverage in various categories and geographies and to ensure that the speed-dial buttons provide a useful service to the end user.

In one embodiment, static head ends to categories of Pay Per Call advertisements are presented on other telephony devices, such as a VoIP terminal, a landline phone, a WiFi phone, a USB phone, a cordless phone, a softphone, etc. The static head ends provide a speed-dial feature for accessing the advertisers of the corresponding categories.

Figure 30:
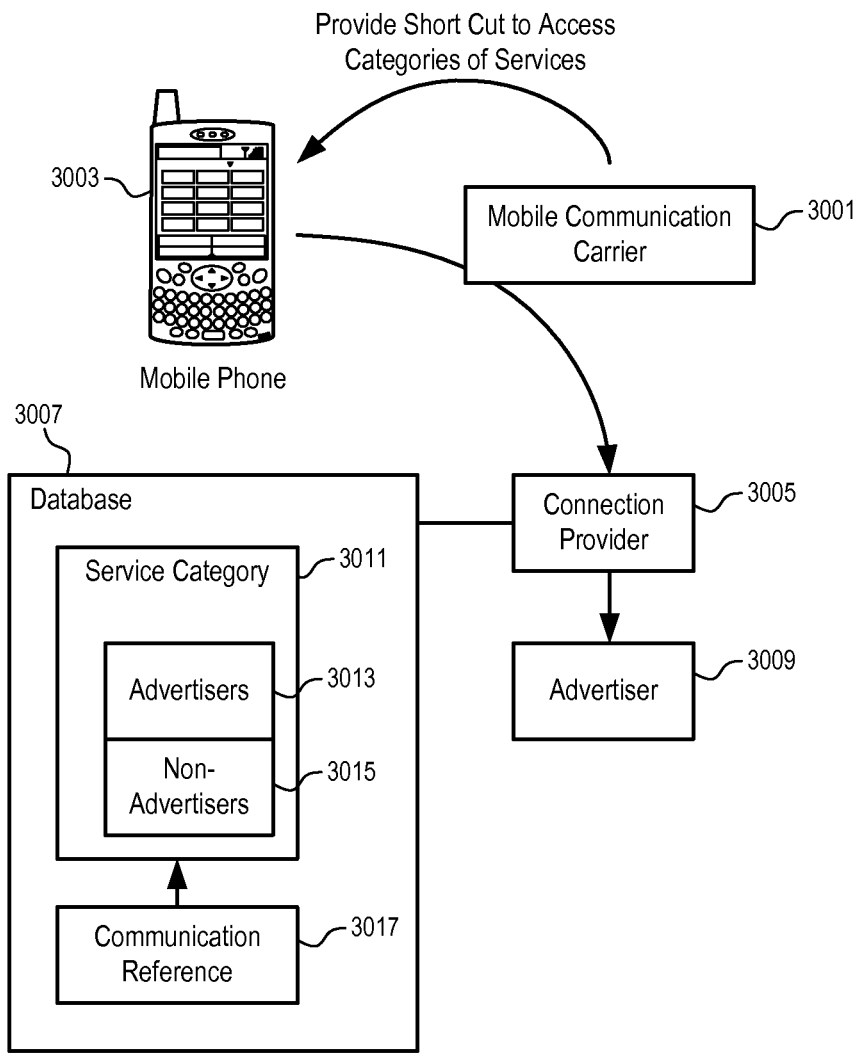
FIG. 30 illustrates a method to connect the user of a mobile device to an advertiser according to one embodiment of the present invention.

FIG. 30 illustrates a method to connect the user of a mobile device to an advertiser according to one embodiment of the present invention. In FIG. 30, a mobile communication carrier (3001) provides short cuts to access categories of services on a mobile phone (3003).

In one embodiment, the short cuts can be provided in the form of dedicated switches (e.g., hardware buttons) pre-configured to dial a set of phone numbers that are associated with the pre-defined service categories. Alternatively, the short cuts can be configured as a static, integrated part of user interface elements displayed as a part of dial interface on the screen of the mobile phone.

For example, different phone numbers that are assigned by the connection provider to different groups of service providers can be pre-configured for the dedicated switches on the mobile phone, such that when a speed-dial switch is activated, the mobile phone dials the pre-configured telephone number assigned by the connection provider.

In one embodiment, the dedicated switches are pre-configured by the mobile communication carrier; and the mobile user is not provided means for re-configure the dedicated switches. Alternatively, the dedicated switches may be re-configured (programmed) by the mobile user for speed-dial a user supplied number.

In one embodiment, the mobile user is limited to re-configuring a dedicated switch for dialing a phone number selected from a set of phone numbers assigned by the connection provider for accessing a pre-defined category of service. Alternatively, the dedicated switch may be re-configured to dial any number specified by the mobile user.

In one embodiment, the user interface element for the speed dial feature is at least partially implemented via software. For example, a set of buttons displayed on a screen of the mobile device can be used to select the desired category and place the speed dial. The buttons displayed on the screen can be activated via the touch screen, or via one or more navigation switches implemented on the mobile device, or via a dial pad of the mobile phone. For example, the buttons displayed on the screen may have associated short cut keys which when pressed activate the corresponding button.

In one embodiment, when the speed dial button is selected, the phone number assigned by the connection provider (3005) is dialed by the mobile phone (3003) for a telephone connection between the connection provider (3005) and the mobile phone (3003). Based on the telephone number dialed by the mobile phone and/or other input from the mobile phone (e.g., an extension dialed by the mobile phone or a data packet sent from the mobile phone to specified the desired geographic area and/or other user preferences/information), the connection provider (3005) selects an advertiser (3009) based on the database (3007). In one embodiment, the geographic area information and/or user preferences/information are determined or looked up based on the identity of the mobile phone (3003); and thus, the mobile phone does not have to further provide the information for the call.

For example, in one embodiment, a communication reference (3017), such as a telephone number (e.g., a telephone number with an extension, or a telephone number without an extension, a SIP URL, a VoIP telephonic reference, etc.), is used to identify the service category (3011). When the communication reference (3017) is used to make the telephone connection between the connection provider (3005) and the mobile phone (3003), the connection provider (3005) can limit the selection of the advertiser (3009) within the advertisers (3013) and non-advertisers (3015) that provide services in the service category (3011). The current availability of the service providers to take the call, the desired geographic service area, the user's age, demographics, psychographics, and/or other preferences can be used to narrow the search. In one embodiment, the highest bidding advertiser in the matched advertisers/non-advertisers is selected for the connection. When there is no matching bidding advertisers, a non-advertiser can be selected (e.g., randomly, or using a rating scheme based on customer feedback, etc.) In another embodiment, the matched advertisers/non-advertisers are ranked according to the potential earnings that can be generated from connection the call to the corresponding advertisers.

In one embodiment, when the selected service provider is a non-advertiser, the connection provider (3005) forwards the call to the selected non-advertiser; when the selected service provider is an advertiser, the connection provider (3005) places a separate call to the advertiser (3009) and bridges/conferences the separate call to the advertiser (3009) and the call from the mobile phone.

In one embodiment, when the speed dial button is selected, the mobile device initiates the call to the connection provider (3005) using the communication references (3017) that is pre-configured with the speed dial button. Alternatively, when the speed dial button is selected, the mobile device may send a data packet to the connection provider (3005), via a data connection, to request a callback to the mobile phone (3003). For example, the data packet may be sent via an HTTP (HyperText Transfer Protocol) request, an SMS message, an instant message, etc. In response to the data packet, the connection provider (3005) initiates a call to the mobile phone (3003) for a connection between the mobile device and the connection provider (3005).

In one embodiment, the connection provider (3005) receives information needed to select the advertiser (3009) from the data packet, selects the advertiser (3009) and optionally presents the advertisement of the advertiser (3009) to the mobile phone, before calling back the mobile phone. In one embodiment, the connection provider (3005) presents one or more matching service providers to the mobile phone with corresponding advertisements. The mobile user can select the advertisement to request a call to the corresponding advertiser.

In one embodiment, a non-advertiser is presented with an advertiser; and the mobile user may be charged a fee for connecting to the presented non-advertiser; and the mobile user may be connected to the presented advertiser for free. In one embodiment, the connection provider (3005) pays for the cost that the mobile communication carrier (3001) charges for the call if the mobile user is connected to an advertiser. Alternatively, the mobile user is free of charge for using the speed dial button to make a connection to a service provider, regardless whether the service provider is an advertiser or a non-advertiser.

Alternatively, the connection provider (3005) connects the mobile device (3003) to an IVR system to obtain further input to select the advertiser, and then optionally presents the advertisement to the mobile phone.

In one embodiment, a speed-dial button is configured for accessing a directory assistance service provided by the connection provider (3005). During the directory assistance call, the service category is identified; and a service provider is selected based on the identified service category and/or other criteria. Alternatively, at least a portion of the search criteria is pre-configured as part of the speed-dial button.

Figure 31:
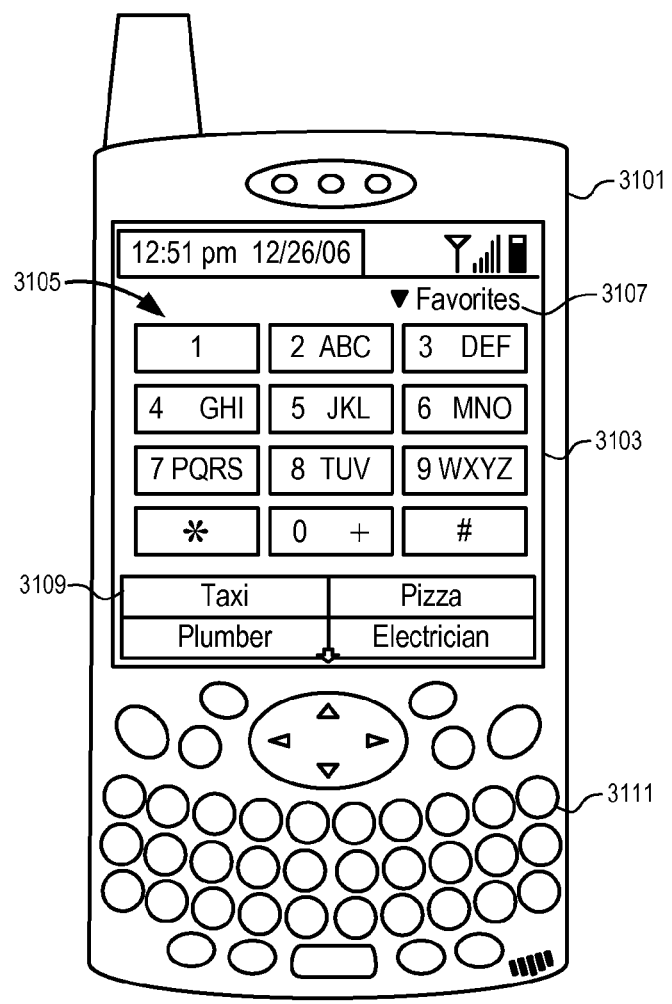
FIG. 31 illustrates a user interface which allows a user of the mobile phone to request a telephone connection to a service provider of a selected category according to one embodiment of the present invention.

FIG. 31 illustrates a user interface which allows a user of the mobile phone to request a telephone connection to a service provider of a selected category according to one embodiment of the present invention. In FIG. 31, the mobile phone (3101) includes a number of switches (e.g., 3111) and a display screen (3103). In one embodiment, the mobile phone (3101) includes a set of switches which form a keyboard that is suitable for thumb typing. In another embodiment, the set of switches include a dial pad and a number of function keys. In one embodiment, the display screen (3103) is touch sensitive, such that a button (or other types of user interface elements, such as a hyper link) displayed on the screen can be selected via a touch at the corresponding area.

In FIG. 31, a dial pad (3105) is displayed on the screen (3103) as a part of the dial interface for placing a phone call. In the dial interface as show in FIG. 31, a set of buttons (e.g., 3109) are also displayed as speed dial buttons for pre-defined service categories. For example, when the button (3109) is selected, the mobile phone (3101) is connected to a connection provider (e.g., 3005) which then selects a service provider based on bid prices of pay per call advertisements, the geographic area in which the mobile phone (3101) is currently in, and/or user information/preferences.

In one embodiment, the speed dial buttons (e.g., 3109) are designed as a static, permanent part of the dial interface. In one embodiment, different speed dial buttons can be displayed when the user customizes the dial interface via the selection box (3107). In one embodiment, the mobile user can configure the dial interface to hide the dial pad and show a selected image in its place. In one embodiment, the mobile user can configure the dial interface to hide the dial pad and show more speed dial buttons in its place.

In one embodiment, some of the speed dial buttons can be reconfigured by the user for other purposes (e.g., for launching an application, for visiting a web page, etc.). In one embodiment, at least one of the speed dial button that is displayed on the dial interface is reserved for access a pre-defined category. In one embodiment, the user can re-configure the category of the speed dial button by selecting a category from a set of pre-define categories. In one embodiment, the mobile user can enter a user defined category, which is to be submitted to the connection provider as a keyword when the speed dial button is selected.

In one embodiment, the speed dial buttons can be configured to have keyword short cuts so that when one or more keys are pressed in a pre-defined way the corresponding speed dial button is selected.

In one embodiment, the categories for the speed dial buttons are assigned to the speed dial buttons displayed on the screen according to the usage patterns of the mobile device. For example, frequently requested categories can be displayed first. The usage frequency may be based on usage patterns of the mobile device (3101), or based on a set of mobile users who have a similar profile. In another embodiment, the categories for the speed dial buttons are randomly assigned to the speed dial buttons displayed on the screen when the dial interface is displayed.

In one embodiment, a panel of speed dial buttons contains more speed dial buttons than that can be displayed concurrently on the screen (3103), together with the dial pad. In one embodiment, the speed dial panel can be scrolled to reveal a selected portion of the panel. In one embodiment, the speed dial panel can moved up temporary to cover the dial pad (3105) and show more speed dial buttons in its place.

Figure 32:
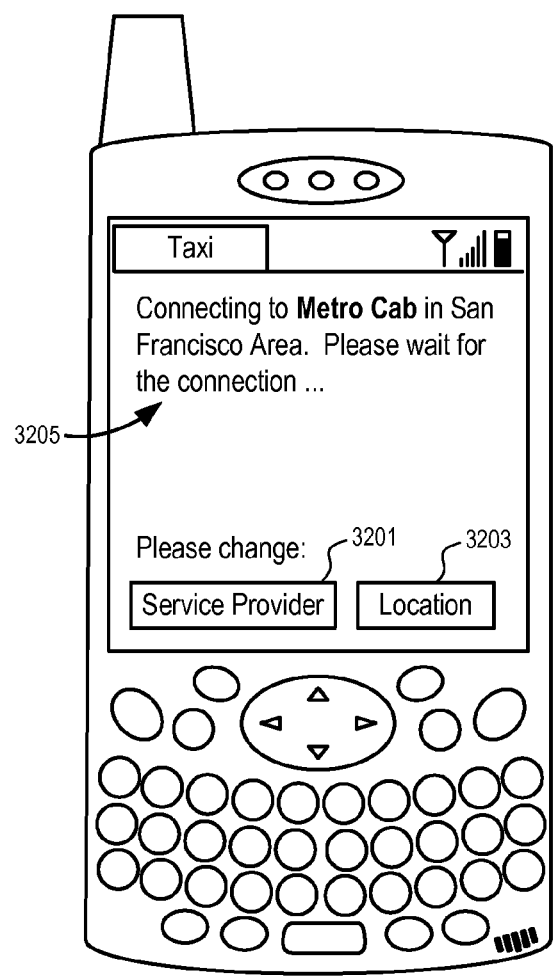
FIG. 32 illustrates a user interface to guide a user through the process of connecting to a service provider according to one embodiment of the present invention.

FIG. 32 illustrates a user interface to guide a user through the process of connecting to a service provider according to one embodiment of the present invention. In FIG. 32, a message (3205) is displayed on the mobile phone after the user selects a speed dial button for taxi. After the connection provider determines the geographic area "San Francisco" for the mobile phone and selects the taxi provider "Metro Cab", a message of "Connecting to Metro Cab in San Francisco Area. Please wait for the connection . . . " is displayed. In one embodiment, the data for the message is provided to the mobile device via a data connection while the mobile device is connected to the connection provider (e.g., 3005).

In FIG. 32, the mobile phone further displays buttons "service provider" (3201) and "location" (3203) to allow the mobile user to switch the connection to a different taxi provider and/or a taxi provider in a different geographic area.

For example, after viewing the message of "Connecting to Metro Cab in San Francisco Area . . . ", the mobile user may not want to be connected to "Metro Cab". Thus, the mobile user can select the button "service provider" (3201) to request the connection provider to select a different taxi provider for the connection.

For example, if the mobile user wants to talk to a taxi provider in an area different from "San Francisco", the mobile user may select the button "location" (3203). In response to the user selecting the button "location" (3203), the mobile user can be connected to an IVR system to provide an indication of the desired location, or be presented with a user interface to specify the location (e.g., via typing in the zip code, or city name in an entry box, or via selecting an area from a map subsequently displayed on the screen of the mobile phone).

In one embodiment, when one of the buttons (3201 and 3203) is selected, the mobile device dials a string of pre-defined number to communicate the selection to the connection provider via the telephone connection. Alternatively, the selection can be transmitted to the connection provider via a separate data communication channel, or as part of the VoIP call to the connection provider.

FIG. 32 illustrates an example of guiding the mobile user through the connection process via visual feedback. Alternatively, or in combination, the connection provider can also guide the user via audio/voice messages.

Figure 33:
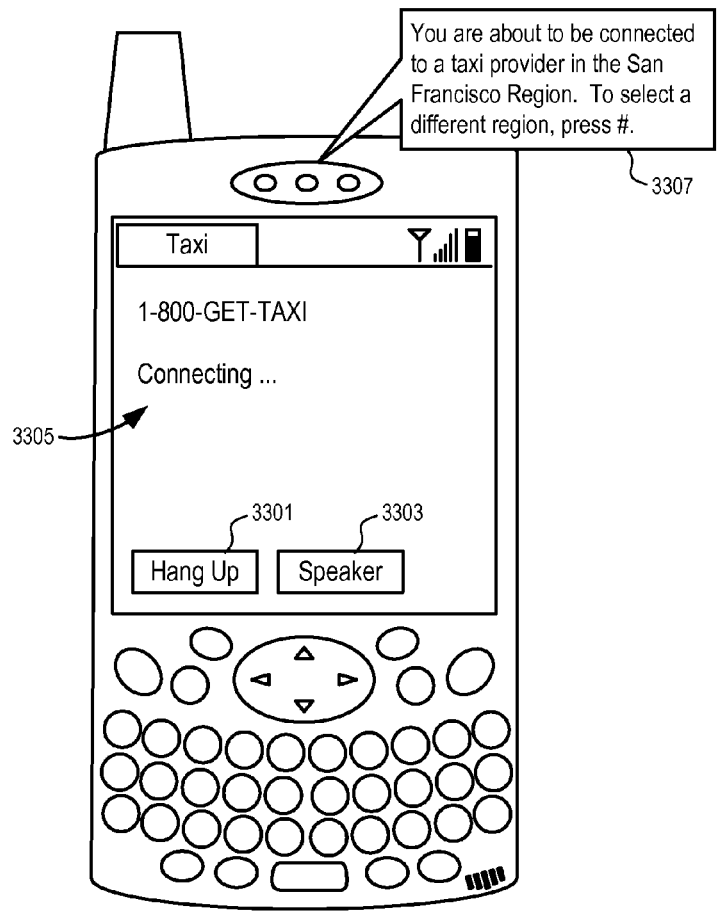
FIG. 33 illustrates another method to guide a user through the process of connecting to a service provider according to one embodiment of the present invention.

FIG. 33 illustrates another method to guide a user through the process of connecting to a service provider according to one embodiment of the present invention. In FIG. 33, the mobile phone displays the phone number dialed via the speed dial button and the connection status (3305). Button "Hang Up" (3301) displayed on the screen of the mobile device can be selected to hang up the call; and button "Speaker" (3303) can be selected to turn on speaker (3303) (e.g., turning the mobile phone into a speaker phone). After the connection provider receives the call placed via the speed dial button, the connection provider plays a message (3307) to confirm the geographic area and provides the mobile user with the opportunity to select a different geographic area by pressing the "#" key.

Figure 34:
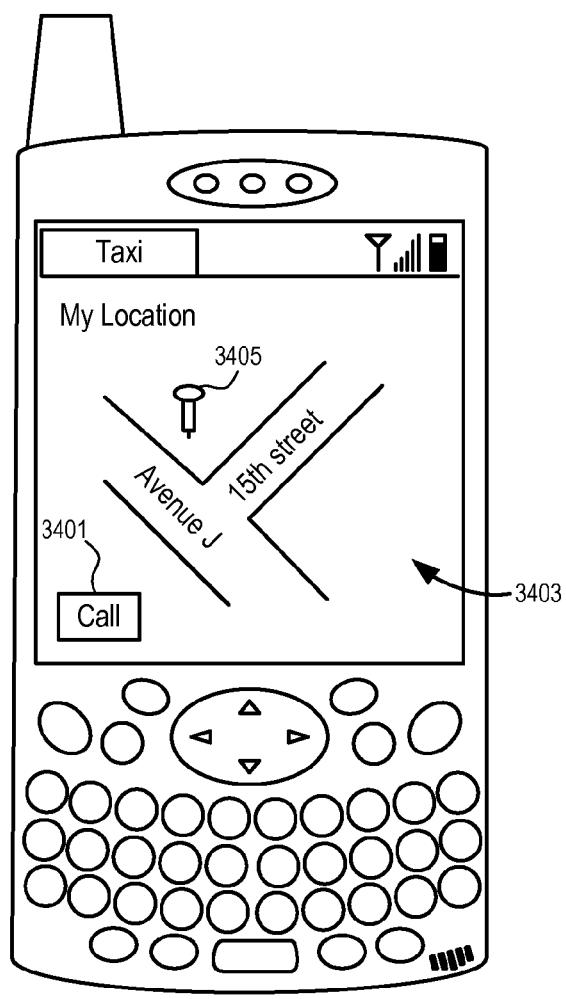
FIG. 34 illustrates a method to determine a location of the desired service via a map before initiating a call to service provider according to one embodiment of the present invention.

FIG. 34 illustrates a method to determine a location of the desired service via a map before initiating a call to service provider according to one embodiment of the present invention. In FIG. 34, the location of the desired service can be specified via a map (3403) displayed on the mobile device. For example, after the user selects the speed dial button (e.g., 3109 in FIG. 31) for taxi, the map (3403) can be displayed to determine the desired pickup location. Once the user selects the desired pickup location (e.g., 3405) using the map (3401), the user can select the button (3401) to place the call. Alternatively, the call is placed in response to the user selecting a location; and during the call, the map and an indication of the selected location (e.g., pin 3405) are displayed to allow the user to modify or specify the pickup location.

In one embodiment, both the display of the map (3403) and the placing of the call are in response to the selection of the speed-dial button; and an input via the map (3403) is optional. For example, when an input via the map (3403) is received, the geographic location information is used to select the service provider and/or provided to the selected service provider as part of the service request. When no input is received via the map (3403), the geographic area information can be determined via other methods, such as a GPS receiver integrated with the mobile device, a cellular tower or access point in communication with the mobile device, a telephone number or IP address of the mobile device, input to an IVR system, etc.

For example, the user selected location (e.g., 3405) is used not only to select the taxi provider but also to inform the taxi provider the desired pickup location on behalf of the mobile user. For example, the connection provider can pass the pickup location specified by the user to the taxi provider and thus simplify the process of ordering taxi service.

In FIG. 34, the mobile user selects the button (3401) displayed with the map (3403) to initiate the call (or request a callback). Alternatively, the map (3403) is displayed while the call is being dialed. Thus, the user can optionally use the map (3403) to select a geographic location.

In one embodiment, the map (3403) is further used to display the location of the service provider after the service provider is selected. For example, after the selection of the service provider, a representation of the service provider can be displayed on the map (3403). For example, an advertisement from the selected service provider can be presented on the map (3403) or be presented with the map (3403).

Figure 35:
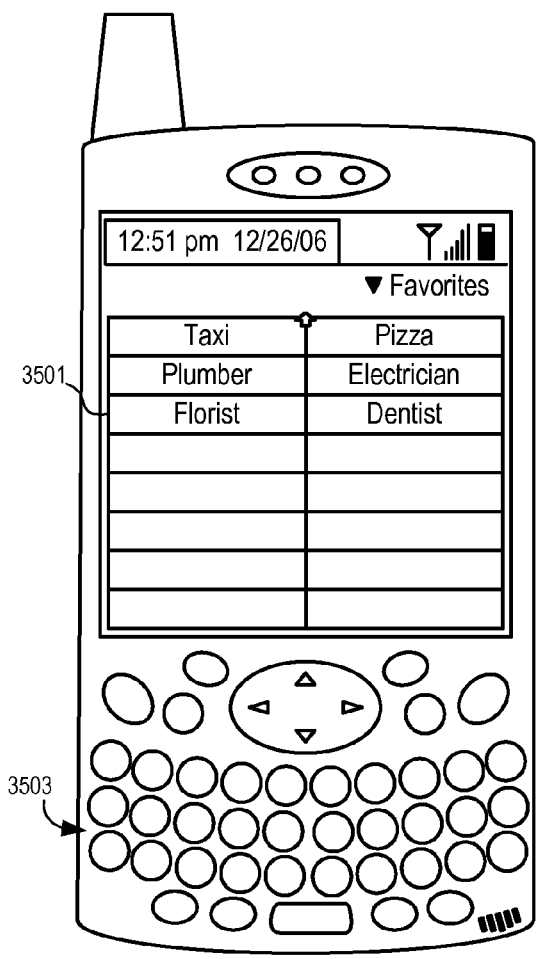
FIG. 35 illustrates a display of favorites for accessing service providers of selected categories according to one embodiment of the present invention.

FIG. 35 illustrates a display of favorites for accessing service providers of selected categories according to one embodiment of the present invention. In FIG. 35, no dial pad is displayed; and more speed dial buttons (e.g., 3501) are displayed. In the dial interface illustrated in FIG. 35, the user can select one of the speed dial buttons to place a call, or directly enter a phone number via the keyboard (3503) to place a call.

Figure 36:
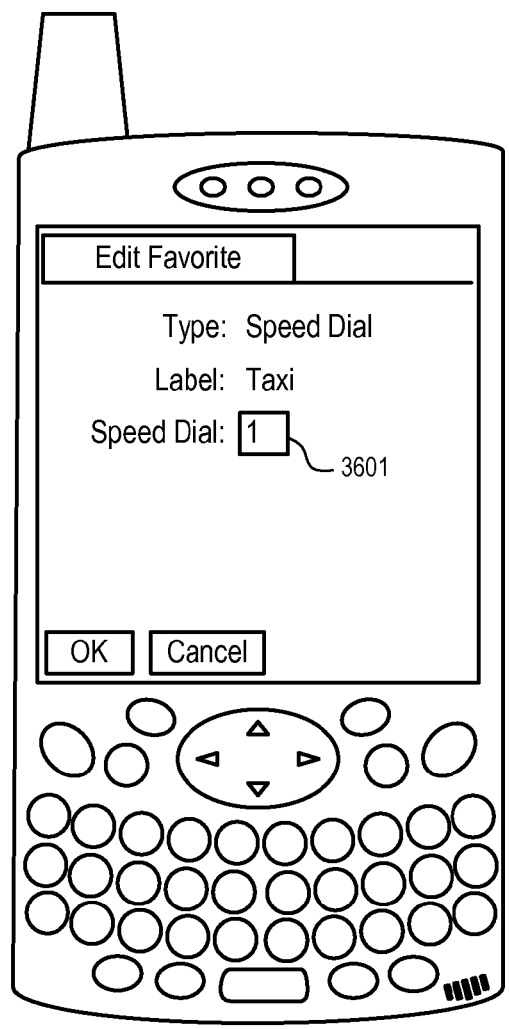
FIGS. 36-37 show examples of editing preferences of favorites for accessing service providers of selected categories according to embodiments of the present invention.
Figure 37:
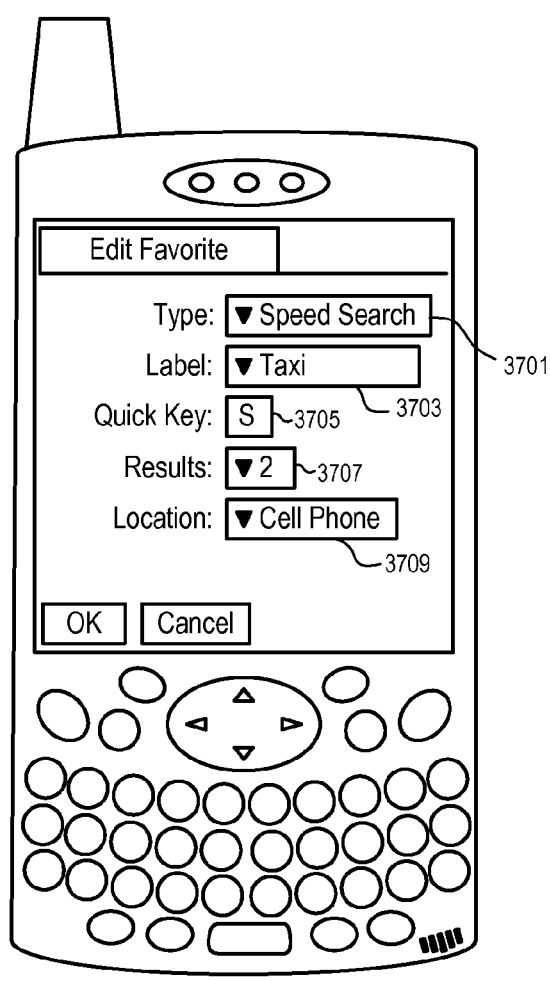

FIGS. 36-37 show examples of editing preferences of favorites for accessing service providers of selected categories according to embodiments of the present invention.

FIG. 36 illustrates an interface for editing the preferences for speed dial button (3109) of FIG. 31. In FIG. 36, the type of action to be performed in response to the selection of the speed dial button and the label (and thus, the associated phone number/service category) are fixed. The user cannot change the type of action and the label associated with this speed dial button (3109). However, the user may select a user specified short cut key (3601) for quick access to the speed dial button (3109). For example, when the user specifies "1" as the short cut key, the speed dial button (3109) displayed on the screen can be activated by pressing and hold key "1" (or double clicking key "1", or clicking key "1" and waiting for a short time period without pressing other keys). Since the label and the action type cannot be redefined by the user, the speed dial button for a specific category of service is a static, permanent part of the dial interface.

In one embodiment, while the action type and the label of the speed dial button are not changeable by the mobile user, the action type and the label can be dynamically changed by the carrier of mobile communication services, or by the mobile device according to a set of pre-configured rules. For example, when the mobile device is turned on, data specifying the action type and the label for the speed dial button can be retrieved from the carrier of the mobile communication services, such that the configurations of the speed dial buttons can be periodically updated by the carrier. For example, the mobile device may be configured to sort the speed dial buttons according to their usage patterns.

In one embodiment, the action type and/or the label can be selected from a set of pre-defined options for accessing categories of services.

FIG. 37 illustrates another interface for editing the preferences for speed dial button (3109) of FIG. 31. In FIG. 37, the mobile user can specify the action to be taken as "speed search". In one embodiment, the mobile user can also change the action to "speed dial". In one embodiment, the selection of the action is limited to access a category of service providers.

In FIG. 37, when the speed dial button is assigned the action of "speed search", the selection of the speed dial button causes the mobile device to submit a search request for a service provider based on the criteria specified in the interface shown in FIG. 37.

For example, the label entry (3703) can be used to specify the service category for the search request. In one embodiment, the user is allowed to enter a keyword specified by the user for the speed search; in another embodiment, the label (3703) is to be selected from a pre-defined set of keywords.

In FIG. 37, the mobile user can specify a short cut key (3705) for quick access to the speed dial button using a keyboard. The mobile user may specify the number of desired search results using the entry box (3707).

In one embodiment, if the mobile user specifies that one result is requested using the entry box (3707), the mobile user can be automatically connected to the service provider presented in the search result.

To pre-define the search, the user may indicate that the geographic location for the search is to be determined as the current geographic location of the cell phone. Alternatively, the user may specify the default geographic location using a zip code, a telephone number, a coordinate, a GPS position, etc.

In one embodiment, the search result is presented to the mobile user before a phone connection to the connection provided is initiated. For example, the search may be submitted via an SMS message, and the search result is received via an SMS message. In one embodiment, the search result includes the advertisement for the selected advertiser and the phone number assigned to the advertiser/advertisement; and thus, the user can select one of the advertisements to initiate the call to the selected advertiser.

In another embodiment, the search result is presented to the mobile user over the phone connection to the connection provider. For example, after the speed dial button is selected, the search request is provided to the connection provider within, or with, the call to the connection provider. The connection provider connects the mobile phone to an IVR system, which reads the search results to the mobile user (e.g., via a text to speech synthesizer, or via playing back one or more pre-recorded audio clips) and prompts the user to select a service provider for the connection (or confirm a service provider selected by the connection provider).

Figure 38:
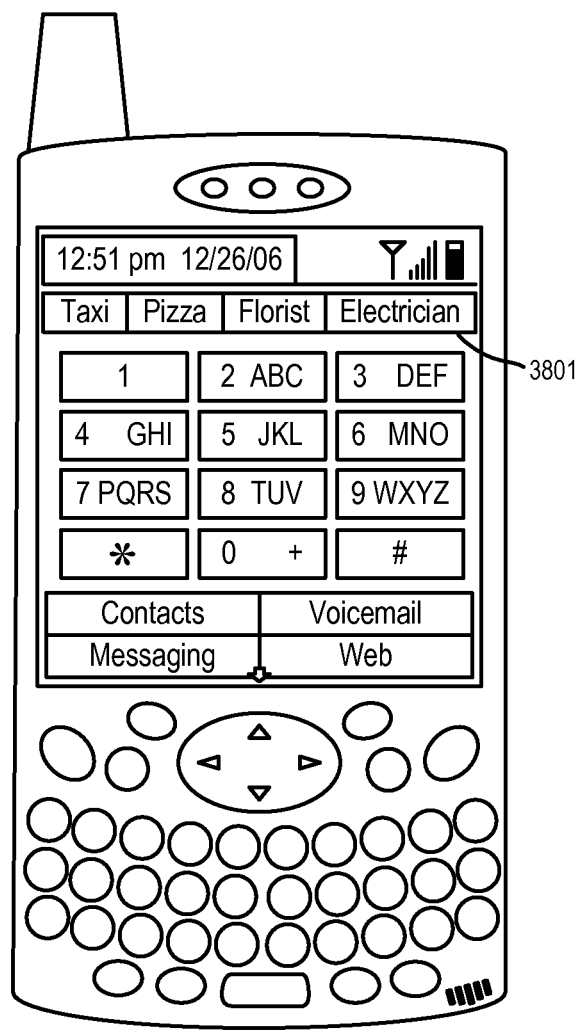
FIGS. 38-40 illustrates other user interfaces for accessing service providers of selected categories according to embodiments of the present invention.
Figure 39:
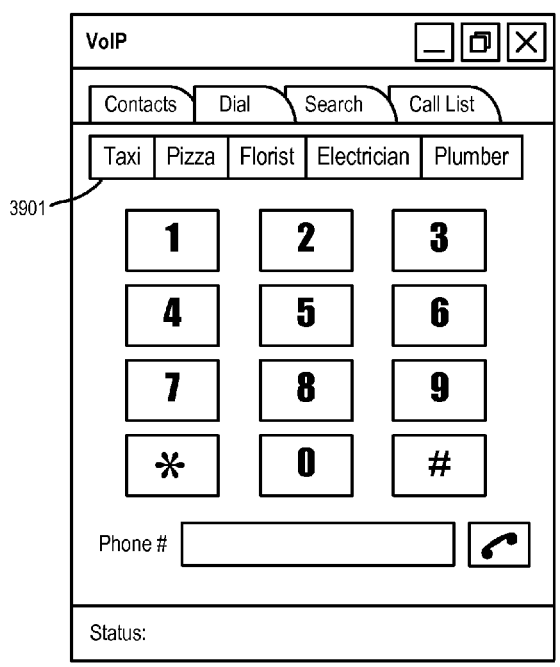
Figure 40:
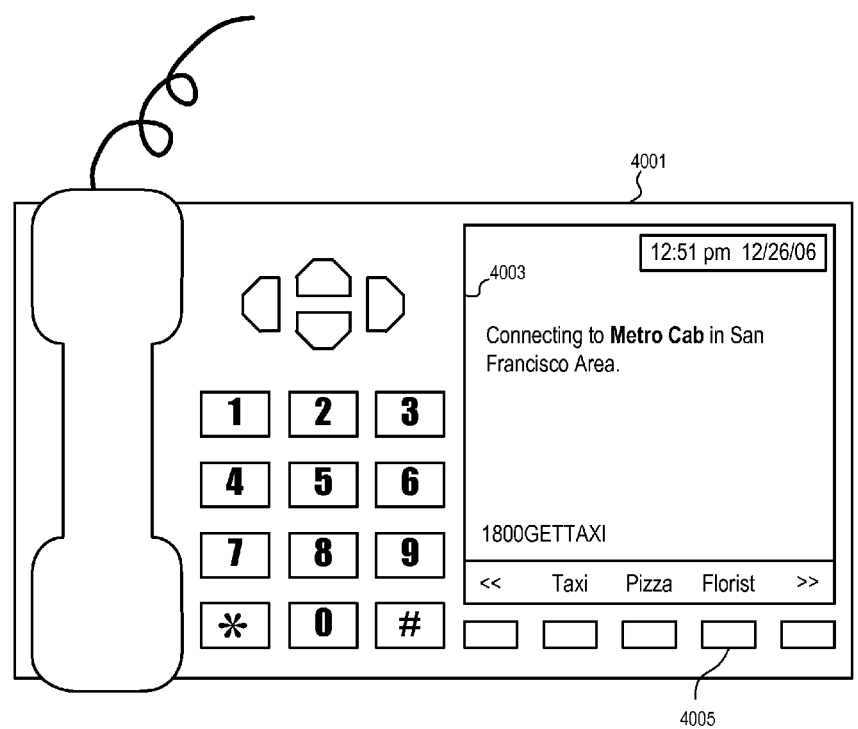

FIGS. 38-40 illustrates other user interfaces for accessing service providers of selected categories according to embodiments of the present invention.

In FIG. 38, the speed dial buttons are presented as a bar (3801) on the dial interface displayed on the screen of a mobile device. In one embodiment, the speed dial buttons can be implemented on a tool bar of a software application.

In FIG. 39, speed dial buttons (e.g., 3901) are presented as part of the dial interface of a softphone (e.g., a VoIP software client application running on a personal computer). In one embodiment, the user interface elements for the speed dial feature can also be implemented as hyperlinks, icons, image maps, etc., which can be presented on a tool bar, or within a frame or panel.

In FIG. 40, speed dial buttons (e.g., 4005) are pre-configured as part of the dial interface of a desktop phone (4001). In one embodiment, the button (4005) is dynamically associated with a label (and thus a service category) based on the programmable display (4003). Alternatively, the button (4005) can be pre-configured and fixedly associated with a service category.

Figure 41:
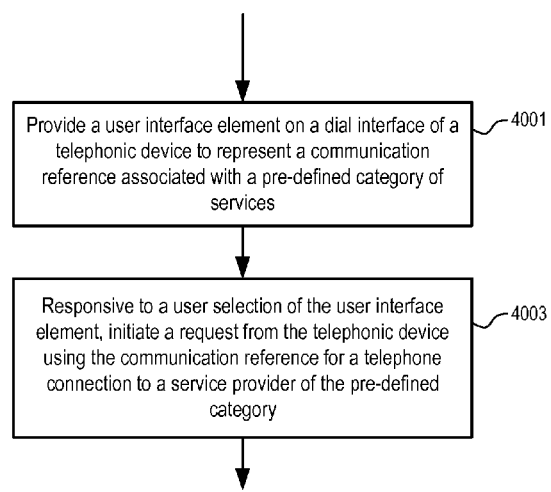
FIG. 41 illustrates a method to connect a user of a telephony device to a selected service provider of a predefined category according to one embodiment of the present invention.

FIG. 41 illustrates a method to connect a user of a telephony device to a selected service provider of a predefined category according to one embodiment of the present invention. In FIG. 41, a user interface element is provided (4001) on a dial interface of a telephonic device to represent a communication reference associated with a pre-defined category of services. Responsive to a user selection of the user interface element, a request from the telephonic device is initiated (4003) using the communication reference for a telephone connection to a service provider of the pre-defined category.

In one embodiment, the service provider is to be selected from a plurality of service providers of the pre-defined category in response to the request; and the service provider is to be charged in response to a telephone lead connected to the service provider. In one embodiment, the telephonic device includes a cellular phone.

In one embodiment, a location of the cellular phone is further determining; and the service provider is selected based at least on the location of the cellular phone and a price specified by the service provider.

In one embodiment, the location of the cellular phone is determined in response to the request. The location of the cellular phone can be determined according to a location of a cell tower in communication with the cellular phone, via an interactive voice response (IVR) system, according to a phone number of the cellular phone, based on an Internet Protocol (IP) address associated the cellular phone, or based on a map displayed on the cellular phone.

In one embodiment, the user interface element includes a display of the pre-defined category of services on a screen of the cellular phone together with the dial interface. The dial interface may include a display of a dial pad on the screen of the cellular phone. In one embodiment, the user interface element is static as a permanent part of the dial interface.

In one embodiment, the user interface element is selectable via pressing less than four switches on the cellular phone after the dial interface is displayed. Preferably, the user interface element is selectable via pressing less than three switches on the cellular phone after the dial interface is displayed. Preferably, the user interface element is selectable via pressing one switch on the cellular phone after the dial interface is displayed.

In one embodiment, the request includes dialing a call according to the communication reference; and the communication reference includes one of: a telephone number without an extension, a telephone number with an extension, a Voice over Internet Protocol (VoIP) telephonic reference, and a Session Initiation Protocol (SIP) Universal Resource Identifier (URI).

In another embodiment, the request initiated from the telephonic device includes a request for a callback to the telephonic device for a connection with the service provider.

In one embodiment, an advertisement for the service provider is received responsive to the request, where the advertisement includes a telephonic reference and the service provider is to be charged for the advertisement based on telephone calls connected to the advertiser.

In one embodiment, the advertisement is displayed while connecting the cellular phone to the service provider. In another embodiment, a call is placed to the service provider according to the telephonic reference responsive to a user selection of the advertisement.

In one embodiment, responsive to the request initiated from the telephonic device, a connection provider establishing a first Voice over Internet Protocol (VoIP) call with a telecommunication carrier which bridges the first VoIP call to cellular phone; the connection provider establishing a second Voice over Internet Protocol (VoIP) call with a telecommunication carrier which bridges the second VoIP call to a public switched telephone network (PSTN) to the service provider; and the first and second VoIP calls are then connected, joined, or conferenced to connect the mobile user and the service provider. In one embodiment, a first virtual softphone of the telecommunication carrier bridges the first VoIP call to the cellular phone; a second virtual softphone of the telecommunication carrier bridges the second VoIP call onto a public switched telephone network (PSTN) to the service provider; and the connecting the first and second VoIP calls includes directing the first and second softphones to establish a direct media connection which does not go through the connection provider.

Figure 42:
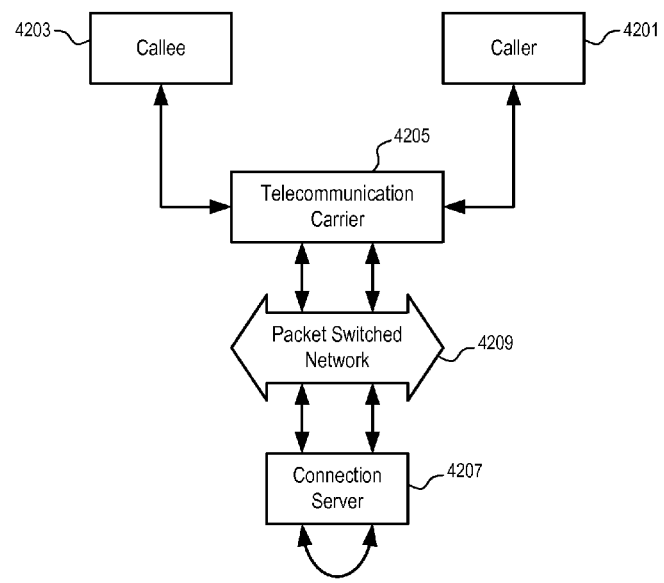
FIG. 42 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 42. In FIG. 42, the connection server (4207) receives and/or places telephone calls via the telecommunication carrier (4205) over the packet switched network (4209). The telecommunication carrier (4205) further routes the telephone communications towards the caller (4201) and the callee (4203).

Since the telecommunication carrier (4205) can route a call from a packet switched network to a variety of destinations (e.g., a traditional analog telephone set, a mobile phone, a cellular phone, a WiFi phone, a Bluetooth phone, a softphone running on a computer, etc.), the connection sever (4207) can use one type of communication connection with the telephone carrier (4205) to facilitate the communication connections with variety of devices used by the customers (e.g., callers and callees). Thus, the implementation of the connection server (4207) can be simplified. In one embodiment, the connection server (4207) can also place and/or receive direct VoIP calls to/from the caller (or callee).

For example, to make a voice connection in response to a click-to-call request, the connection server can place separate VoIP calls, via the telecommunication carrier (4205), to the caller (4201) (e.g., the requester of the click-to-call) and the callee (4203) (e.g., the destination of the click-to-call request).

If the caller (4201) (or the callee 4203) is on a public switched telephone network (PSTN), the telecommunication carrier (4205) bridges the packet switched the network and the public switched telephone network (PSTN). The telecommunication carrier (4205) routes the call from the packet switched network (4209) to the caller (4201) (or the callee 4203) on the circuit switched network. Thus, the caller (4201) (or the callee 4203) can use a telephone set to receive the call via a Plain Old Telephone Service (POTS). The connection server (4207) joins the separate calls that are placed via the packet switched network (4209) to connection the callee (4203) and the caller (4201).

In one embodiment, call signaling and media content may use different network paths. While call signaling is arranged to go through the packet switched network (4209) and the connection server (4207), the media stream does not have to go through the connection server (4207). For example, when the calls are joined, the media content may be redirected to flow over the communication carrier (4205) without going through the packet switched network (4209) to the connection server (4207) for improved performance and efficiency. The connection server (4207) can release the control over the media stream to allow the media stream to flow through the shortest path, without going through the connection server, while maintaining control to the connection for the call by staying on the path for call signaling.

In another example, when the caller (4201) initiates a call over a PSTN to the connection server (4207), the telecommunication carrier (4205) converts the call for the packet switched network (4209) for the connection server (4207).

In one embodiment, virtual softphones on the telecommunication carrier (4205) are assigned to the caller (4201) and the callee (4203) for interfacing with the connection server (4207) over the packet switched network (4209). The virtual softphones encapsulates the devices and networks used by the caller (4201) and callee (4203) to access the connection server (4207); and the telecommunication carrier (4205) shields the connection server (4207) from the implementation details of the user devices and networks used by the caller (4201) and the callee (4203). The connection server (4207) calls (or receives calls from) and connects the virtual softphones on the telecommunication carrier (4205) to connect the caller (4201) and the callee (4203).

In FIG. 42, the telephone connection between the telecommunication carrier (4205) and the connection server (4207) is facilitated via a packet switched network (4209). Thus, the connection server (4207) can operate efficiently in a digital domain. The connection server (4207) interfaces with the telecommunication carrier (4205) using one type of Internet Telephony systems (e.g., SIP-based Internet telephony).

Alternatively, a connection server may include some or all of the functionality of the telecommunication carrier (4205). For example, the connection server may be configured to bridge a packet switched network and a circuit switched network. The connection server may support multiple, different types of Internet Telephony systems.

In one embodiment, the connection server (4207) and the telecommunication carrier (4205) are operated by different, separate entities. Alternatively, the connection server (4207) and the telecommunication carrier (4205) may be operated by the same entity. In another embodiment, the telecommunication carrier (4205) includes a set of facilities operated by a number of separate entities.

In one embodiment, the caller (4201) and/or the callee (4203) may also place/receive calls via a packet switched network. The telecommunication carrier (4205) may route the calls between the caller (4201) and the callee (4203) without using a PSTN. In one embodiment, caller (4201) and/or the callee (4203) may place calls to or receive calls from the connection server (4207) via Internet.

Figure 43:
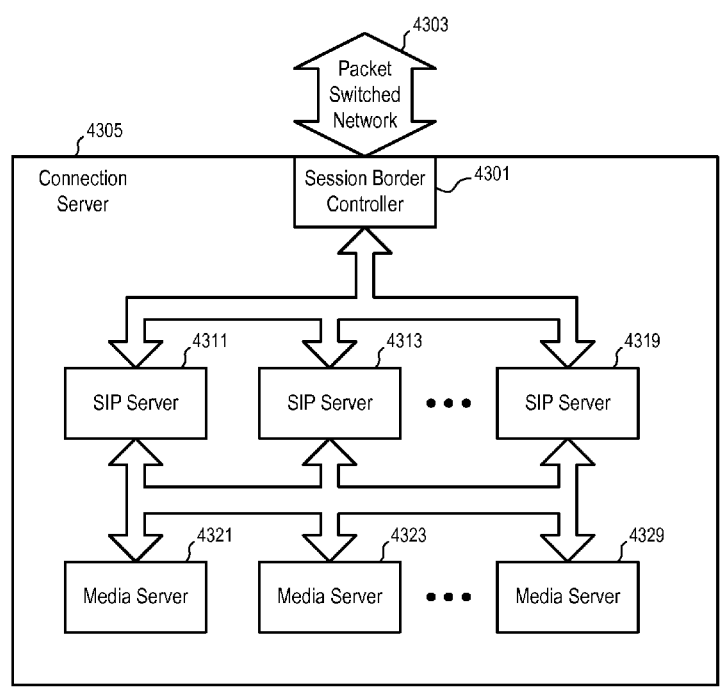
FIG. 43 shows a connection server according to one embodiment.

FIG. 43 shows a connection server according to one embodiment. In FIG. 43, the connection server (4305) is configured to place and/or receive VoIP calls using Session Initiation Protocol (SIP). A session border controller (4301) is used to interface with the packet switched network (4303) and control the types of network traffic related to VoIP calls that might go into the connection server (4305).

In one embodiment, the session border controller (4301) is configured to control the signaling and media stream during the setting up, conducting and tearing down of VoIP calls to or from the connection server (4305). In some embodiments, the session border controller (4301) may pick up the call that comes to the session border controller (4301), places a separate call from the session border controller (4301), and joins the received call and the placed call to control both the signaling and media stream. In some embodiments, the session border controller (4301) may perform signaling/encoding translation to allow the connection server (4305) to process the VoIP calls in one standard, while receiving VoIP calls in a variety of standards (e.g., SIP, H.323, etc.). In one embodiment, the session border controller (4301) is configured to perform one or more firewall functionalities, such as denial of service protection, call filtering, bandwidth management, etc.

In one embodiment, the session border controller (4301) is configured to perform media releasing operation. When the session border controller (4301) determines that the source and destination of a media stream is on the same side of the session border controller (4301) (e.g., both the source and the destination of the media stream is outside the connection server 4305), the session border controller (4301) can release the hairpining of the media stream and allow the media stream to flow without going through the session border controller (4301).

In FIG. 43, a set of SIP servers (e.g., 4311, 4313, . . . , 4319) are networked to the session border controller (4301) to receive messages for incoming calls and to initiate outgoing calls. The session border controller (4301) is configured to evenly distribute the calls for processing by the SIP servers.

For example, when an incoming message for the initiation of a call is received (e.g., a SIP INVITE message from the telecommunication carrier 4205), the session border controller (4301) may route it to a SIP server (e.g., 4311) for processing. The INVITE message includes the phone number dialed by the caller and the contact information about the caller (e.g., the phone number of the caller 4201 and/or the identity of the virtual SIP phone at the telecommunication carrier 4205).

The SIP server may determine whether the phone number dialed by the caller (4203) is sufficient to determine the phone number of the callee (e.g., 4203). If the phone number of the callee (e.g., 4203) can be determined from the phone number dialed by the caller (4203) (e.g., via decoding the phone number dialed by the callee, or looking up the phone number of the callee from a table using the phone number dialed by the caller as a key), the SIP server can place a separate SIP call to the callee via the packet switched network (4303) and then connect the caller and the callee. Alternatively, the SIP server can further route the SIP INVITE message (e.g., to the telecommunication carrier (4205) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (4321) (or a virtual softphone on SIP server) as the initiator for a separate call. The SIP server then connects the calls for the media stream.

In one embodiment, the caller is first connected to a media server (e.g., 4321, 4323, or 4329). For example, the SIP server may forward the SIP INVITE message to one or more of the media servers for answering the call. When a media server (e.g., 4321) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (4303) (e.g., by sending a SIP INVITE message to the telecommunication carrier 4205, which further bridges the call to the callee 4203). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (4301) into the connection server (4305). For example, the media stream can go through the telecommunication carrier (4205) in FIG. 42 without going to the connection server (4207) after the SIP server connects the caller and the callee.

However, the SIP server stays on the signaling path to monitor the progress and termination of the call. The SIP server can also break the connection between the caller and the callee, or force the media stream to come through the connection serve (4305). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (4303) for a connection to the caller. The SIP call may be bridged onto a circuit switched network (e.g., by a telecommunication carrier 4205). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (4311, 4313, . . . , 4319) and media servers (4321, 4323, . . . , 4329) are implemented on separate computers connected via a local area network (and/or intranet or Internet). Alternatively, at least the some of the servers can be implemented on a same computer. In one embodiment, the SIP servers and the media servers are also integrated with the session border controller (4301) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (4305) may further include a database server (4305) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
providing, by a connection server, a user interface element to a mobile communication device, the user interface element for display on a user interface of the mobile communication device, wherein the user interface element represents a communication reference associated with a predefined category of services;
receiving, from the mobile communication device, a communication request associated with the communication reference;
in response to the communication request, selecting, by the connection server, a service provider from a plurality of service providers for the predefined category of services, wherein the selected service provider has offered a highest bid to handle the communication request;
connecting the mobile communication device to the selected service provider; and
charging the selected service provider for the connection based on the selected service provider's bid.

2. The method of claim 1, wherein the mobile communication device comprises a cellular phone.

3. The method of claim 2, further comprising:
determining, by the connection server, a location of the cellular phone; and
selecting the advertised service provider based at least partially on the location of the cellular phone.

4. The method of claim 3, wherein determining of the location of the cellular phone includes determining at least one of:
the location of the cellular phone according to a location of a cell tower in communication with the cellular phone;
the location of the cellular phone via an interactive voice response system;
the location of the cellular phone according to a phone number of the cellular phone;
the location of the cellular phone based on an internet protocol address associated the cellular phone; and
the location of the cellular phone based on a map displayed on the cellular phone.

5. The method of claim 2, wherein the user interface element displays the pre-defined category of services together with a display of a dial interface via a screen of the user interface of the cellular phone.

6. The method of claim 5, wherein the dial interface comprises a display of a dial pad on the screen of the cellular phone.

7. The method of claim 5, wherein the user interface element is static as a permanent part of the dial interface.

8. The method of claim 5, wherein the screen comprises a touch screen; and the pre-defined category of services is selectable via the touch screen.

9. The method of claim 5, wherein the user interface element is selectable via one of a pre-defined switch on the cellular phone and a predefined button display on the touch screen.

10. The method of claim 9, wherein the user interface element is selectable via pressing and holding the one of the switch and the button display for a period of time.

11. The method of claim 5, wherein the user interface element is selectable via pressing less than four of a group consisting of switches and button displays on the cellular phone after the user interface element is displayed.

12. The method of claim 1, the communication reference comprises one of: a telephone number without an extension, a telephone number with an extension, a voice over Internet protocol telephonic reference, and a session initiation protocol universal resource identifier.

13. The method of claim 1, wherein the communication request comprises a request for a callback to the mobile communication device for a connection with the service provider.

14. The method of claim 1, further comprising:
responsive to the communication request, providing, by the connection server, an advertisement for the selected service provider to the mobile communication device, wherein the advertisement includes the communication reference.

15. The method of claim 14, further comprising:
displaying the advertisement while connecting the mobile communication device to the selected service provider.

16. The method of claim 14, further comprising:
responsive to a user selection of the advertisement, establishing a connection between the mobile communication device and the selected service provider.

17. The method of claim 1, wherein connecting the mobile communication device to the selected service provider includes:
establishing a first voice over Internet protocol call with a telecommunication carrier which bridges the first voice over Internet protocol call to the mobile communication device;
establishing a second voice over Internet protocol call with a telecommunication carrier which bridges the second voice over Internet protocol call to a public switched telephone network used by the selected service provider; and
connecting the first and second voice over Internet protocol calls.

18. The method of claim 17, wherein a first virtual softphone bridges the first voice over Internet protocol call to the mobile communication device, a second virtual softphone bridges the second voice over Internet protocol call onto the public switched telephone network used by the selected service provider, and connecting the first and second voice over Internet protocol calls includes directing the first and second softphones to establish a direct media connection.

19. A tangible machine readable medium storing instructions that, when executed by a connection server, cause the connection server to:
provide a user interface element to a mobile communication device, the user interface element for display on a user interface of the mobile communication device, wherein the user interface element represents a communication reference associated with a predefined category of services;
receive, from the mobile communication device, a communication request associated with the communication reference;
in response to the communication request, select a service provider from a plurality of service providers for the predefined category of services, wherein the selected service provider has offered a highest bid to handle the communication request;
connect the mobile communication device to the selected service provider; and
charge the selected service provider for the connection based on the selected service provider's bid.

20. A system, comprising:
at least one processor; and
a memory storing instructions that, when executed by the at least one processor, cause the system to:
provide a user interface element to a mobile communication device, the user interface element for display on a user interface of the mobile communication device, wherein the user interface element represents a communication reference associated with a predefined category of services;
receive, from the mobile communication device, a communication request associated with the communication reference;
in response to the communication request, select a service provider from a plurality of service providers for the predefined category of services, wherein the selected service provider has offered a highest bid to handle the communication request;
connect the mobile communication device to the selected service provider; and
charge the selected service provider for the connection based on the selected service provider's bid.

* * * * *